(12) United States Patent
Zhang

(10) Patent No.: US 10,100,861 B2
(45) Date of Patent: Oct. 16, 2018

(54) BEAM CLAMP FOR STRUT CHANNEL

(71) Applicant: Cooper Technologies Company, Houston, TX (US)

(72) Inventor: Zhihui Zhang, Edwardsville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/939,830

(22) Filed: Nov. 12, 2015

(65) Prior Publication Data

US 2016/0138634 A1    May 19, 2016

Related U.S. Application Data

(60) Provisional application No. 62/079,984, filed on Nov. 14, 2014.

(51) Int. Cl.
| | |
|---|---|
| *F16B 7/04* | (2006.01) |
| *E04B 1/41* | (2006.01) |
| *F16B 2/06* | (2006.01) |
| *E04B 1/58* | (2006.01) |
| *F16L 3/24* | (2006.01) |
| *E04C 3/04* | (2006.01) |

(52) U.S. Cl.
CPC .............. *F16B 7/0493* (2013.01); *E04B 1/40* (2013.01); *E04B 1/5812* (2013.01); *F16B 2/065* (2013.01); *E04B 2001/5875* (2013.01); *E04C 2003/0473* (2013.01); *F16B 7/0473* (2013.01); *F16L 3/24* (2013.01)

(58) Field of Classification Search
CPC .......... F16B 7/0493; F16B 2/065; E04B 1/40; E04B 1/5812; E04B 9/18; F16L 3/24

USPC ......................................................... 52/167.1
See application file for complete search history.

(56) References Cited

U.S. PATENT DOCUMENTS

| | | | | |
|---|---|---|---|---|
| 1,319,652 | A | * | 10/1919 | Korns ....................... F16L 3/24 248/72 |
| 1,813,545 | A | | 7/1931 | Reinhold |
| 1,934,760 | A | | 11/1933 | Awbrey |
| 1,963,908 | A | | 6/1934 | Manasek |
| 2,307,653 | A | | 1/1943 | Wright |
| 2,375,513 | A | | 5/1945 | Bach |
| 2,420,826 | A | | 5/1947 | Irrgang |
| 2,470,991 | A | | 5/1949 | Kindorf et al. |

(Continued)

FOREIGN PATENT DOCUMENTS

| | | |
|---|---|---|
| CN | 202416847 U | 9/2012 |
| DE | 7701100 | 5/1977 |

(Continued)

OTHER PUBLICATIONS

Unistrut—General Engineering Catalog. North American Edition No. 12.*

(Continued)

*Primary Examiner* — Paola Agudelo
(74) *Attorney, Agent, or Firm* — Senniger Power LLP

(57) ABSTRACT

A beam clamp for securing strut to a beam includes a clamp body having a first strut engagement portion configured for engaging a first attachment structure of a strut, and a second strut engagement portion separate from the first strut engagement portion and configured for engaging a second attachment structure of a strut.

12 Claims, 20 Drawing Sheets

(56) References Cited

U.S. PATENT DOCUMENTS

| | | | |
|---|---|---|---|
| 2,567,463 A * | 9/1951 | Atkinson | F16L 3/227 |
| | | | 24/277 |
| 2,676,680 A | 4/1954 | Kindort | |
| 2,767,609 A | 10/1956 | Cousino | |
| 2,767,951 A | 10/1956 | Cousino | |
| 2,804,180 A | 8/1957 | Richardson | |
| 2,846,169 A | 8/1958 | Sullivan | |
| 2,944,642 A | 7/1960 | Evans | |
| 3,005,292 A | 10/1961 | Reiland | |
| 3,226,069 A | 12/1965 | Clarke | |
| 3,266,761 A * | 8/1966 | Walton | F16L 3/1207 |
| | | | 174/159 |
| 3,310,264 A | 3/1967 | Appleton | |
| 3,312,034 A | 4/1967 | Steinmann | |
| 3,396,499 A | 8/1968 | Biffani | |
| 3,417,951 A | 12/1968 | Rebentisch, Jr. | |
| 3,451,183 A | 6/1969 | Lespagnol et al. | |
| 3,463,428 A | 8/1969 | Kindorf et al. | |
| 3,486,726 A | 12/1969 | Kindorf et al. | |
| 3,513,606 A | 5/1970 | Jones | |
| 3,527,432 A | 9/1970 | Lytle | |
| 3,547,385 A | 12/1970 | Kindorf et al. | |
| 3,566,561 A | 3/1971 | Tozer | |
| 3,592,493 A | 7/1971 | Goose | |
| 3,601,347 A | 8/1971 | Attwood et al. | |
| 3,612,461 A | 10/1971 | Brown | |
| 3,650,499 A | 3/1972 | Biggane | |
| 3,748,808 A | 7/1973 | Sheppard et al. | |
| 3,752,198 A | 8/1973 | Fiorentino et al. | |
| 3,757,485 A | 9/1973 | Vincens | |
| 3,836,936 A | 9/1974 | Clement | |
| 3,863,300 A | 2/1975 | Becker | |
| 3,944,308 A | 3/1976 | Persson | |
| 3,986,314 A | 10/1976 | Moeller | |
| 3,998,419 A | 12/1976 | Semmerling | |
| 4,044,428 A | 8/1977 | Kowalski | |
| 4,185,802 A | 1/1980 | Myles et al. | |
| 4,211,381 A | 7/1980 | Heard | |
| 4,216,930 A | 8/1980 | Rossler, Jr. et al. | |
| 4,227,355 A | 10/1980 | Wendt | |
| 4,358,216 A | 11/1982 | Pleickhardt et al. | |
| 4,379,651 A | 4/1983 | Nagashima | |
| 4,397,437 A * | 8/1983 | Madej | F16B 2/065 |
| | | | 248/72 |
| 4,417,711 A | 11/1983 | Madej | |
| 4,479,341 A | 10/1984 | Schuplin | |
| 4,490,064 A | 12/1984 | Ducharme | |
| 4,506,418 A * | 3/1985 | Viola | F16L 25/04 |
| | | | 24/20 CW |
| 4,516,296 A | 5/1985 | Sherman | |
| 4,556,148 A | 12/1985 | Koller | |
| 4,610,562 A | 9/1986 | Dunn | |
| 4,637,748 A | 1/1987 | Beavers | |
| 4,652,170 A | 3/1987 | Lew | |
| 4,657,458 A | 4/1987 | Woller et al. | |
| 4,666,355 A | 5/1987 | Stover | |
| 4,708,554 A | 11/1987 | Howard | |
| 4,726,165 A | 2/1988 | Brinsa | |
| 4,729,532 A * | 3/1988 | Moss | F16L 3/00 |
| | | | 248/230.1 |
| 4,784,552 A | 11/1988 | Rebentisch | |
| 4,830,531 A | 5/1989 | Condit et al. | |
| 4,895,412 A | 1/1990 | Deley et al. | |
| 4,934,886 A | 6/1990 | Aikens | |
| 4,948,313 A | 8/1990 | Zankovich | |
| 4,950,099 A | 8/1990 | Roellin | |
| 4,961,553 A | 10/1990 | Todd | |
| 4,962,914 A | 10/1990 | Taylor | |
| 4,993,670 A * | 2/1991 | Tesar | F16L 3/1091 |
| | | | 248/68.1 |
| 5,003,741 A | 4/1991 | Yeh | |
| 5,014,940 A * | 5/1991 | Sherman | F16L 3/04 |
| | | | 248/62 |
| 5,022,614 A | 6/1991 | Rinderer | |
| D322,929 S | 1/1992 | Abbestam et al. | |
| 5,078,537 A | 1/1992 | Nomura | |
| 5,102,074 A | 4/1992 | Okada | |
| 5,116,161 A | 5/1992 | Faisst | |
| 5,118,233 A | 6/1992 | Mitchell | |
| 5,127,758 A | 7/1992 | Kreusel | |
| 5,141,186 A | 8/1992 | Cusic | |
| 5,146,724 A | 9/1992 | Angelo | |
| 5,163,644 A | 11/1992 | Kowalski | |
| 5,175,971 A | 1/1993 | McCombs | |
| 5,205,022 A * | 4/1993 | Norton | F16L 3/04 |
| | | | 24/276 |
| 5,215,281 A * | 6/1993 | Sherman | F16L 55/035 |
| | | | 248/219.4 |
| 5,228,263 A | 7/1993 | Vaughn | |
| 5,271,586 A | 12/1993 | Schmidt | |
| 5,274,888 A * | 1/1994 | Payne | F16L 3/02 |
| | | | 24/277 |
| 5,292,013 A | 3/1994 | Earl | |
| 5,335,890 A | 8/1994 | Pryor et al. | |
| 5,351,926 A | 10/1994 | Moses | |
| 5,356,234 A | 10/1994 | Vangool | |
| 5,375,798 A | 12/1994 | Hungerford, Jr. | |
| 5,489,173 A | 2/1996 | Hofle | |
| 5,503,511 A | 4/1996 | Flamme | |
| 5,531,539 A | 7/1996 | Crawford | |
| 5,566,916 A * | 10/1996 | Bailey | F16L 3/1226 |
| | | | 24/277 |
| 5,595,363 A | 1/1997 | De Leebeeck | |
| 5,628,508 A | 5/1997 | Koole | |
| 5,628,598 A | 5/1997 | Höfle | |
| 5,655,816 A | 8/1997 | Magnuson et al. | |
| 5,655,865 A | 8/1997 | Plank et al. | |
| 5,718,403 A * | 2/1998 | Ott | F16B 43/00 |
| | | | 248/219.4 |
| 5,729,948 A | 3/1998 | Levy et al. | |
| 5,746,535 A | 5/1998 | Kohler | |
| 5,779,412 A | 7/1998 | Nagai et al. | |
| 5,799,452 A | 9/1998 | Moore | |
| 5,799,907 A | 9/1998 | Andronica | |
| 5,806,268 A | 9/1998 | Koller | |
| 5,806,897 A | 9/1998 | Nagai et al. | |
| 5,820,322 A | 10/1998 | Hermann et al. | |
| 5,833,417 A | 11/1998 | Sargent et al. | |
| 5,855,342 A | 1/1999 | Hawkins et al. | |
| 5,864,997 A * | 2/1999 | Kelly | A01G 9/14 |
| | | | 403/294 |
| 5,915,803 A | 6/1999 | Daugherty et al. | |
| 5,918,999 A | 7/1999 | Lamarca | |
| 5,924,650 A | 7/1999 | Richichi | |
| 5,927,041 A * | 7/1999 | Sedlmeier | E04B 9/064 |
| | | | 248/49 |
| 5,934,818 A | 8/1999 | Schmitt et al. | |
| 5,970,679 A | 10/1999 | Amore | |
| 5,984,243 A | 11/1999 | Pfaller et al. | |
| 5,988,930 A | 11/1999 | Liebetrau et al. | |
| D421,655 S | 3/2000 | Daugherty et al. | |
| 6,061,984 A | 5/2000 | Rose | |
| 6,062,764 A | 5/2000 | Rixen et al. | |
| 6,106,189 A * | 8/2000 | Seale | F16B 7/0493 |
| | | | 248/230.3 |
| 6,195,953 B1 | 3/2001 | Gitter et al. | |
| 6,322,030 B1 | 11/2001 | Marra | |
| 6,347,904 B1 * | 2/2002 | Knighton | E04C 5/166 |
| | | | 248/65 |
| 6,454,232 B1 * | 9/2002 | Roth | F16B 2/065 |
| | | | 248/226.11 |
| 6,484,358 B1 | 11/2002 | Duong et al. | |
| 6,494,415 B1 | 12/2002 | Roth | |
| 6,554,235 B1 | 4/2003 | Fortier | |
| 6,561,473 B1 * | 5/2003 | Ianello | E04G 7/14 |
| | | | 248/214 |
| 6,572,057 B1 | 6/2003 | Roth | |
| 6,588,713 B2 | 7/2003 | Kilkenny | |
| 6,655,099 B1 | 12/2003 | Trenoweth | |
| 6,660,938 B2 | 12/2003 | Herb et al. | |
| 6,679,461 B1 | 1/2004 | Hawkins | |
| 6,682,253 B2 | 1/2004 | Binna et al. | |

(56) References Cited

U.S. PATENT DOCUMENTS

| | | | |
|---|---|---|---|
| 6,712,543 B1 | 3/2004 | Schmalzhofer | |
| 6,726,117 B2 | 4/2004 | Herb et al. | |
| 6,751,914 B2 | 6/2004 | Zeh et al. | |
| 6,766,992 B1* | 7/2004 | Parker | F16M 13/02 248/218.4 |
| 6,802,171 B2 | 10/2004 | McKinnon | |
| 6,899,511 B2 | 5/2005 | Gurevich et al. | |
| 6,991,198 B1* | 1/2006 | Roth | F16B 7/0433 248/58 |
| 7,014,213 B1 | 3/2006 | Kaiser | |
| 7,044,701 B2 | 5/2006 | Herb | |
| 7,070,374 B2 | 7/2006 | Womack et al. | |
| 7,096,641 B2 | 8/2006 | Birnbaum et al. | |
| 7,165,361 B2 | 1/2007 | Vanagan | |
| 7,179,010 B2 | 2/2007 | Weger et al. | |
| 7,240,884 B2 | 7/2007 | Shim | |
| 7,287,733 B2 | 10/2007 | Bongio et al. | |
| 7,389,621 B2 | 6/2008 | Hawes | |
| 7,448,822 B2 | 11/2008 | Nebeker et al. | |
| 7,478,787 B2 | 1/2009 | Bankston et al. | |
| 7,484,697 B1 | 2/2009 | Nelson | |
| 7,600,724 B2 | 10/2009 | Nelson et al. | |
| 7,604,444 B2 | 10/2009 | Wu | |
| 7,661,915 B2 | 2/2010 | Whipple | |
| 7,818,925 B2 | 10/2010 | Benedict | |
| 7,922,130 B2 | 4/2011 | Hawkins | |
| 7,922,417 B2 | 4/2011 | Jimenez | |
| 7,934,896 B2 | 5/2011 | Schnier | |
| 7,984,601 B2 | 7/2011 | Birnbaum et al. | |
| 8,020,328 B2 | 9/2011 | Lavi et al. | |
| 8,100,600 B2 | 1/2012 | Blum | |
| D654,064 S * | 2/2012 | Sergi | D14/238 |
| 8,225,581 B2 | 7/2012 | Strickland et al. | |
| 8,277,158 B2 | 10/2012 | Csik et al. | |
| 8,303,223 B2 | 11/2012 | Rass et al. | |
| 8,341,913 B2 | 1/2013 | Meres et al. | |
| 8,366,340 B2 | 2/2013 | Munakata et al. | |
| 8,454,259 B2 | 6/2013 | Oetlinger | |
| 8,465,242 B2 | 6/2013 | Arendt et al. | |
| 8,511,929 B2 | 8/2013 | Raye et al. | |
| 8,523,923 B2 | 9/2013 | Thomke et al. | |
| 8,567,030 B2 | 10/2013 | Koch et al. | |
| 8,596,009 B2 | 12/2013 | Baxter et al. | |
| 8,661,765 B2 | 3/2014 | Schaefer et al. | |
| 8,662,455 B2 | 3/2014 | Hernandez et al. | |
| 8,695,296 B2 | 4/2014 | Bergman | |
| D728,753 S | 5/2015 | Hikoyama | |
| 9,187,898 B1 | 11/2015 | Underkofler et al. | |
| 9,194,418 B2 | 11/2015 | Parthibhan et al. | |
| 9,249,994 B2* | 2/2016 | Zuritis | |
| 9,651,171 B2 | 5/2017 | Zhang et al. | |
| 9,746,105 B2 | 8/2017 | Zhang et al. | |
| 2002/0000498 A1 | 1/2002 | Workman | |
| 2002/0060280 A1 | 5/2002 | Yaphe et al. | |
| 2002/0110435 A1 | 8/2002 | Herb et al. | |
| 2002/0122691 A1 | 9/2002 | Wood | |
| 2003/0042033 A1 | 3/2003 | Herb et al. | |
| 2003/0043033 A1 | 3/2003 | Lee | |
| 2003/0063961 A1 | 4/2003 | Lay | |
| 2003/0122044 A1 | 7/2003 | Unverzagt et al. | |
| 2003/0159397 A1 | 8/2003 | Birnbaum | |
| 2003/0185643 A1 | 10/2003 | Thompson | |
| 2004/0165943 A1 | 8/2004 | Herb | |
| 2004/0165947 A1 | 8/2004 | Herb | |
| 2004/0165965 A1 | 8/2004 | Unverzagt et al. | |
| 2004/0228681 A1 | 11/2004 | Herb | |
| 2005/0116123 A1 | 6/2005 | Bailey et al. | |
| 2005/0129458 A1 | 6/2005 | Hoffmann | |
| 2006/0027715 A1 | 2/2006 | Dinh et al. | |
| 2006/0038398 A1 | 2/2006 | Whipple et al. | |
| 2007/0040075 A1 | 2/2007 | Moretto | |
| 2007/0075213 A1 | 4/2007 | Foser et al. | |
| 2007/0101670 A1 | 5/2007 | Ahren et al. | |
| 2007/0120036 A1 | 5/2007 | Olle et al. | |
| 2007/0145222 A1 | 6/2007 | Rausch | |
| 2007/0248793 A1 | 10/2007 | Herb et al. | |
| 2008/0217490 A1* | 9/2008 | Bucciferro | F16B 2/065 248/74.1 |
| 2008/0229699 A1 | 9/2008 | Nehls | |
| 2010/0102011 A1 | 4/2010 | Blum | |
| 2010/0193645 A1 | 8/2010 | Merhar et al. | |
| 2012/0110788 A1 | 5/2012 | Chen | |
| 2012/0119037 A1 | 5/2012 | Azuma et al. | |
| 2012/0286110 A1 | 11/2012 | Hill | |
| 2012/0297723 A1 | 11/2012 | Siddiqui et al. | |
| 2012/0315106 A1 | 12/2012 | Amedt et al. | |
| 2013/0047541 A1 | 2/2013 | Mayer | |
| 2014/0042286 A1 | 2/2014 | Jaffari | |
| 2014/0091050 A1 | 4/2014 | Zhang | |
| 2014/0093307 A1 | 4/2014 | Zhang | |
| 2014/0097304 A1 | 4/2014 | Mastro | |
| 2014/0197284 A1 | 7/2014 | Hikoyama | |
| 2014/0260083 A1 | 9/2014 | Zhang et al. | |
| 2014/0283475 A1 | 9/2014 | Zhang et al. | |
| 2015/0176631 A1 | 6/2015 | McCarthy et al. | |
| 2015/0276092 A1 | 10/2015 | Oliver et al. | |
| 2015/0316178 A1 | 11/2015 | Patil et al. | |
| 2015/0316203 A1 | 11/2015 | Zhang et al. | |
| 2015/0322669 A1* | 11/2015 | Shih | E04B 1/40 52/698 |
| 2016/0138633 A1 | 5/2016 | Zhang et al. | |

FOREIGN PATENT DOCUMENTS

| | | |
|---|---|---|
| DE | 8232700 | 6/1983 |
| DE | 3513382 A1 | 10/1986 |
| DE | 8704502 | 7/1987 |
| DE | 102006035405 A1 | 5/2008 |
| DE | 202010004406 U1 | 8/2010 |
| DE | 102009000603 A1 | 9/2010 |
| DE | 20 2012 102 394 U1 | 9/2012 |
| EP | 0 592 743 A1 | 10/1992 |
| EP | 2 838 170 B1 | 3/2016 |
| GB | 569377 | 5/1945 |
| GB | 687403 | 2/1953 |
| GB | 1157545 | 7/1969 |
| GB | 1370645 | 10/1974 |
| JP | 2000-139583 A | 5/2000 |
| WO | 98/37349 | 8/1998 |
| WO | 2006085185 A1 | 8/2006 |
| WO | 2013125821 A1 | 8/2013 |
| WO | 2014159372 A1 | 10/2014 |

OTHER PUBLICATIONS

Drawing of MQM Wing Nut, 1 page.
4.2 MQ Systems Components Page (2015), 1 page.
B-Line by Eaton—Channel Nuts Hardware, Strut Systems, 9 pages.
Power Strut Engineering Catalog—Pictorial Table of Contents, pp. 11-14, www.alliedeg.com, 4 pages.
Unistrut, Channels Nuts, Top Retainer Nut, 1 page.
Unistrut, P1000® P1001 Channels, 1 page.
Unistrut, P1100® P1101 Channels, 1 page.
Unistrut, P2000® P2001 Channels, 1 page.
Unistrut General Engineering Catalog, Unistrut Corporation, Mar. 1, 1998; pp. 117, 118.
"Power-Strut®Engineering Catalog, Tyco International, 2008, pp. 63, 65".
International Search Report and Written Opinion for PCT/US2015/060601, dated Jan. 29, 2016, 12 pages.
A guide to threadlocking adhesives, Reliable Plant, May 28, 2013, (online), retrieved on Apr. 27, 2017, retrieved from the internet, https://web.archive.org/web/20130528020650/http://www.reliableplant.com/Read/27159/Guide-to-threadlocking-adhesives.
"Dovetail" Google.com, retrieved online on Sep. 18, 2017 from URL:https://www.google.com/search?q=define%A+dovetail.

* cited by examiner

BEAM CLAMP FOR STRUT CHANNEL

FIELD OF THE DISCLOSURE

The present disclosure generally relates to a beam clamp for use with strut channel.

BACKGROUND

Strut channel or channel framing, also referred to as simply "strut," is used in the construction and electrical industries for structural support, often for supporting wiring, plumbing, or mechanical components such as air conditioning or ventilation systems. Strut is usually formed from metal sheet, folded over into an open channel shape with inturned lips to provide additional stiffness and as a location to mount fittings for securing one or more components to the strut. In some applications, it is desirable to mount pieces of strut from a supporting structure, such as a beam.

A new design of channel framing suitable for use as strut is disclosed in co-pending U.S. application Ser. No. 13/966,897 filed Aug. 14, 2013. The strut disclosed in the '897 application includes the open channel and the inturned lips for mounting conventional fitting(s) thereto and also offers additional sides that are functional for mounting additional fitting(s) to secure one or more components to other sides of the strut.

SUMMARY

In one aspect, a beam clamp for securing strut to a beam comprises a clamp body including a first strut engagement portion configured for engaging a first attachment structure of a strut, and a second strut engagement portion separate from the first strut engagement portion and configured for engaging a second attachment structure of a strut.

In another aspect, a beam clamp for mounting a strut on a beam comprises a clamp body including a base having a first side, a second side opposite the first side, a first end extending between the first and second sides, and a second end opposite the first end and extending between the first and second sides. The base defines a first slot extending inward from the first end in a direction toward the second end and a second slot extending inward from the second side in a direction toward the first side. A first leg extends from the first side of the base in a first direction. The first leg includes a first strut engagement portion configured for engaging a first attachment structure of a strut. A second leg extends from the second side of the base in a second direction opposite the first direction. The second leg includes a second strut engagement portion configured for engaging a second attachment structure of a strut. A U-bolt has a first shank configured to be received in the first slot and a second shank configured to be received in the second slot, wherein the U-bolt is configured for securing the clamp body and a strut to a beam.

BRIEF DESCRIPTION OF THE DRAWINGS

Corresponding reference characters indicate corresponding parts throughout the drawings.

DETAILED DESCRIPTION

Figure 1:
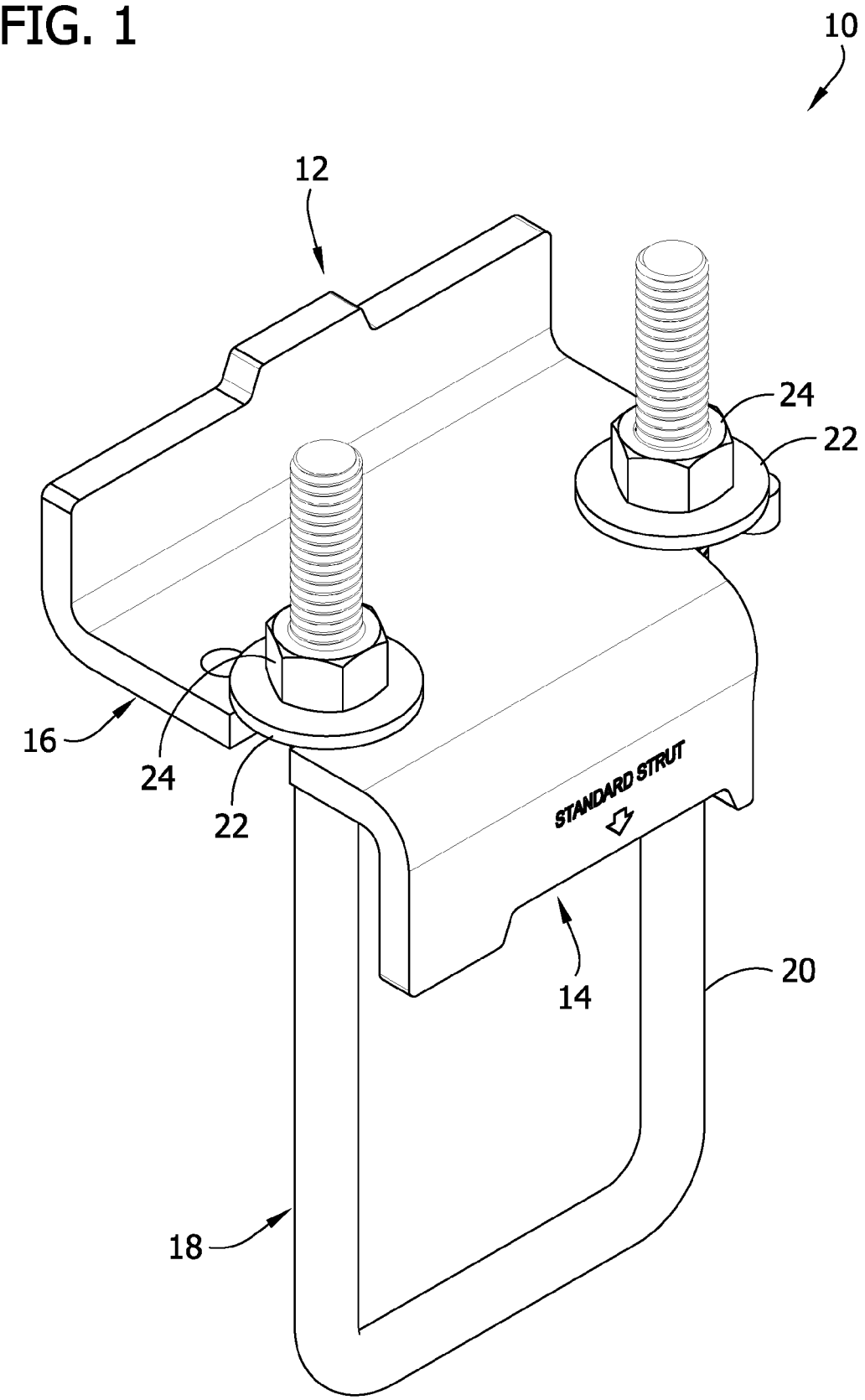
FIG. 1 is a perspective of a beam clamp for use in mounting a strut to a beam, with a clamp body of the beam clamp in a first orientation.
Figure 2:
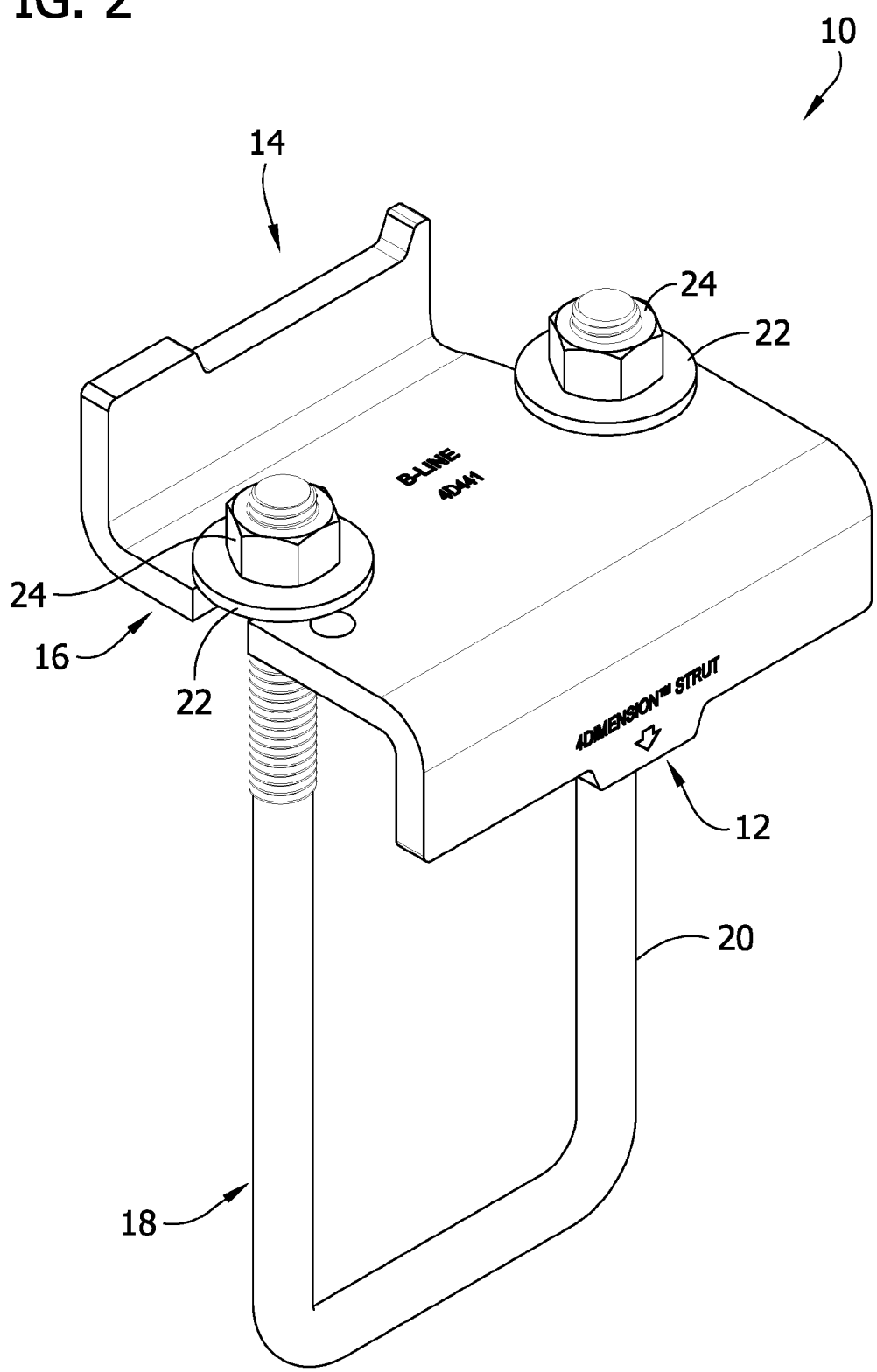
FIG. 2 is a perspective of the beam clamp, with the clamp body in a second orientation.

Referring to FIGS. 1 and 2, a beam clamp for mounting strut channel (also referred to in the below disclosure as simply "strut") on a support member (e.g., beam B) is generally indicated at 10. The beam clamp 10 is configured for use with multiple strut configurations. Specifically, the beam clamp 10 includes separate first and second strut engagement portions 12, 14 (indicated generally) for use with strut types having different fitting attachment structures, as described in detail below.

The beam clamp 10 includes a clamp body, generally indicated at 16, and a fastener (e.g., bolt assembly 18) configured to attach the clamp body to the beam B. The bolt assembly 18 includes U-bolt 20, washers 22, and nuts 24 for securing the clamp body 16 (and strut) to the beam B.

Referring to FIGS. 3-9, the clamp body 16 includes a base 30 and first and second legs 32, 34 extending from opposite ends of the base. The first leg 32 extends from a first end 36 of the base 30 in a first direction generally perpendicular to the base (e.g., upward in FIG. 3). The second leg 34 extends from a second end 38 of the base 30 in a second direction generally perpendicular to the base and opposite the first direction (e.g., downward in FIG. 3). As illustrated, the base 30, first leg 32, and second leg 34 are generally planar. In the illustrated embodiment, the clamp body 16 is formed as a unitary structure. The clamp body 16 may be formed from rigid metal, such as low carbon steel, stainless steel, aluminum, or other metals, or from other material.

Figure 3:
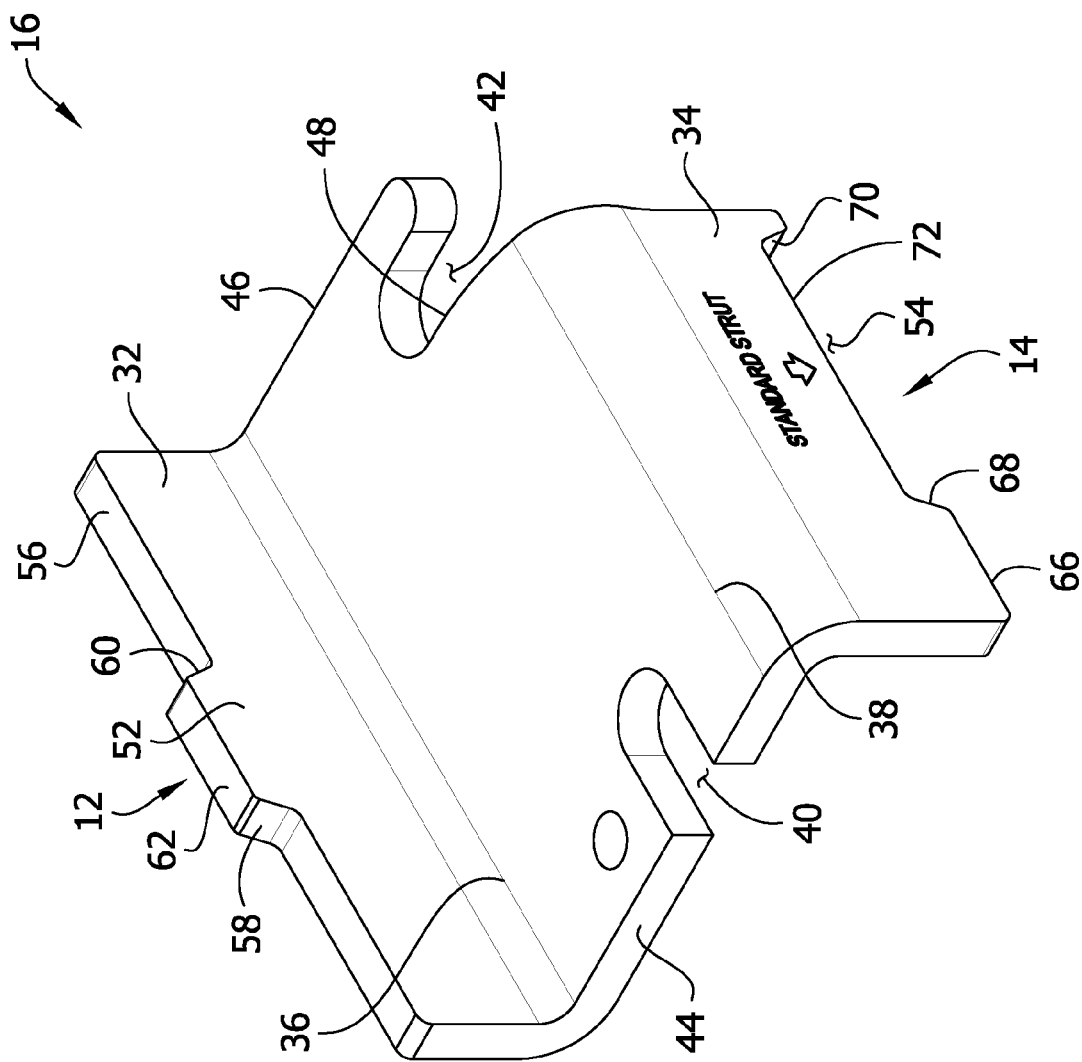
FIG. 3 is a perspective of the clamp body.
Figure 4:
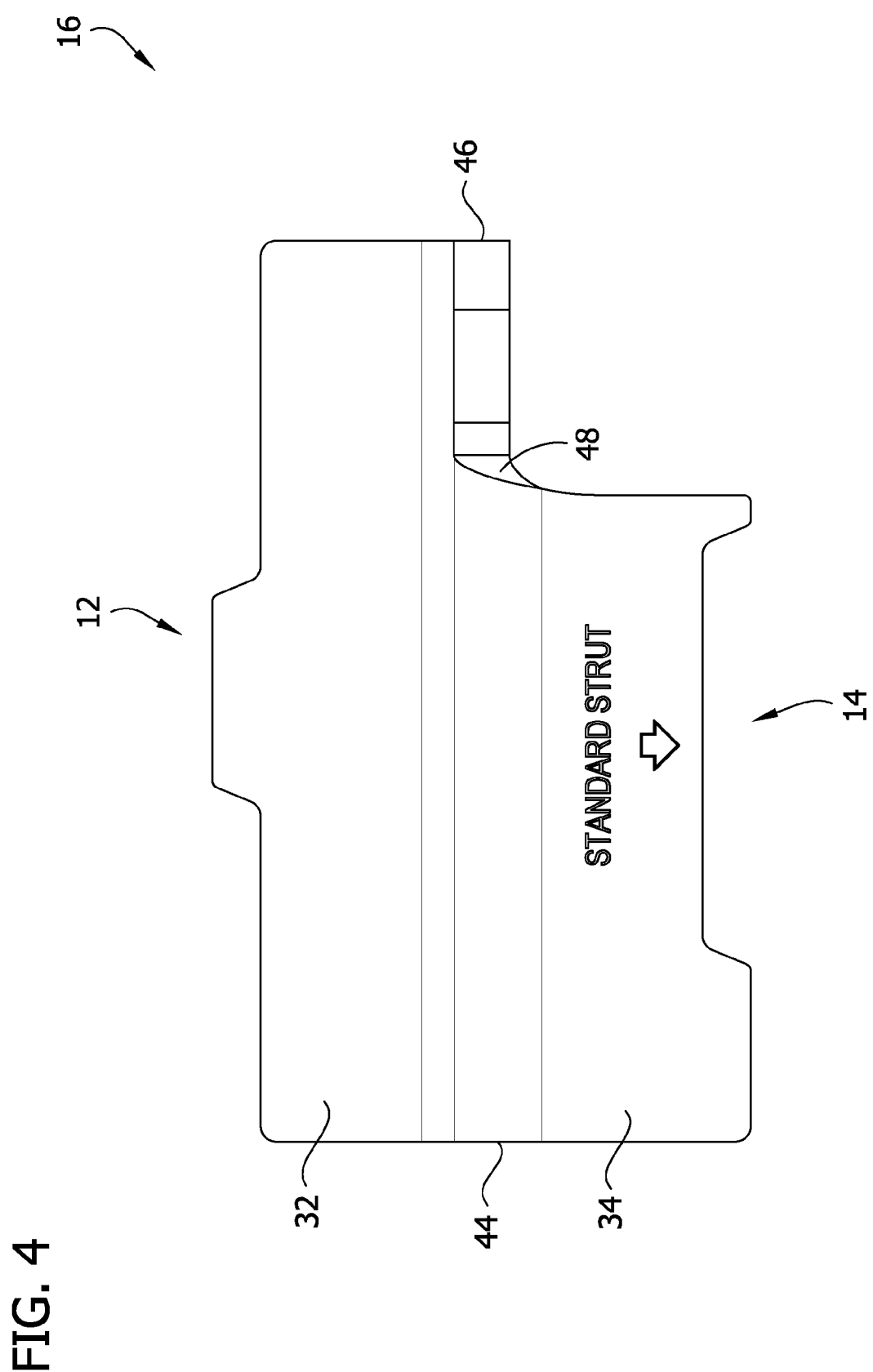
FIG. 4 is a front elevation of FIG. 3.
Figure 5:
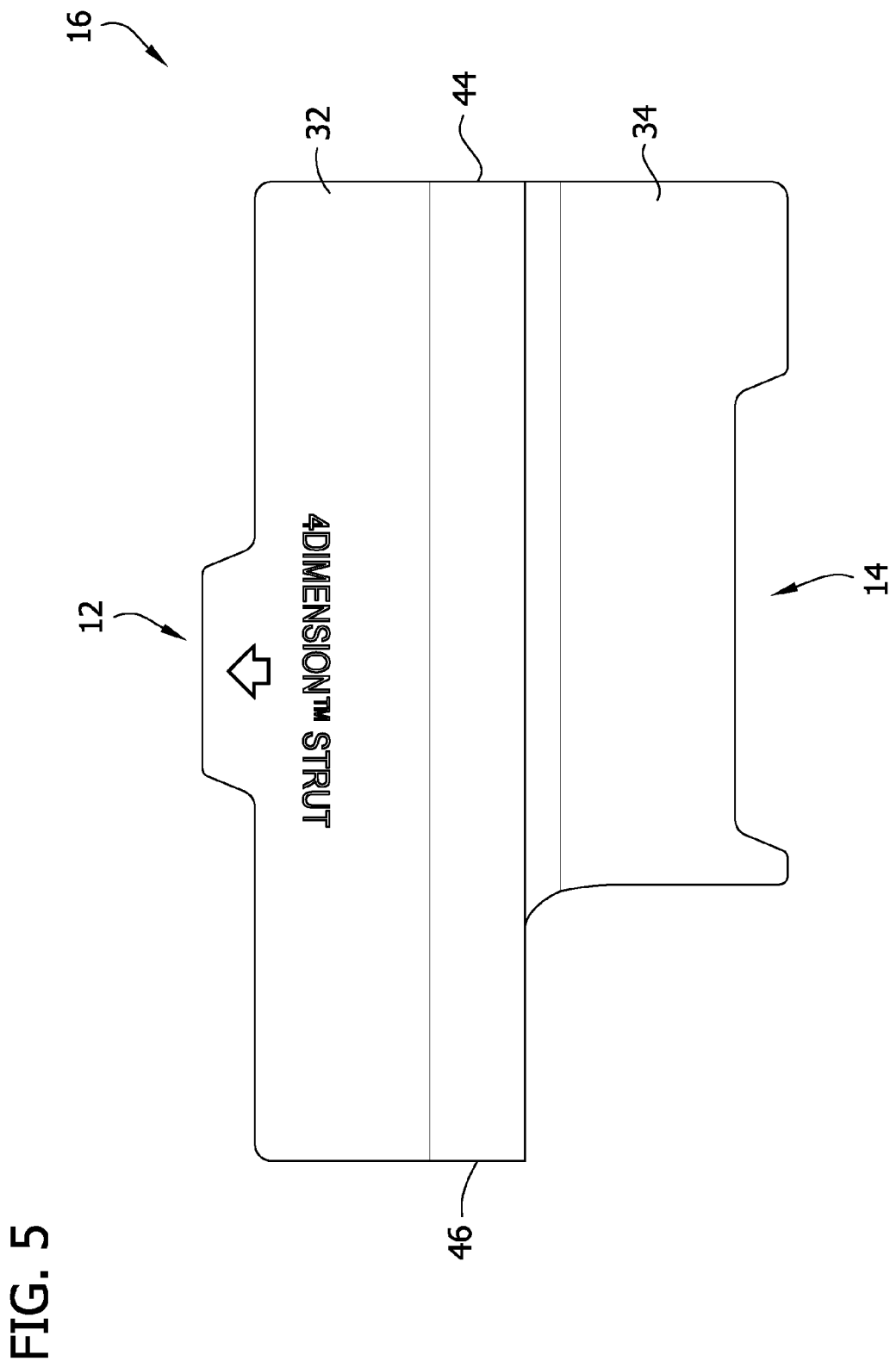
FIG. 5 is a rear elevation of FIG. 3.
Figure 6:
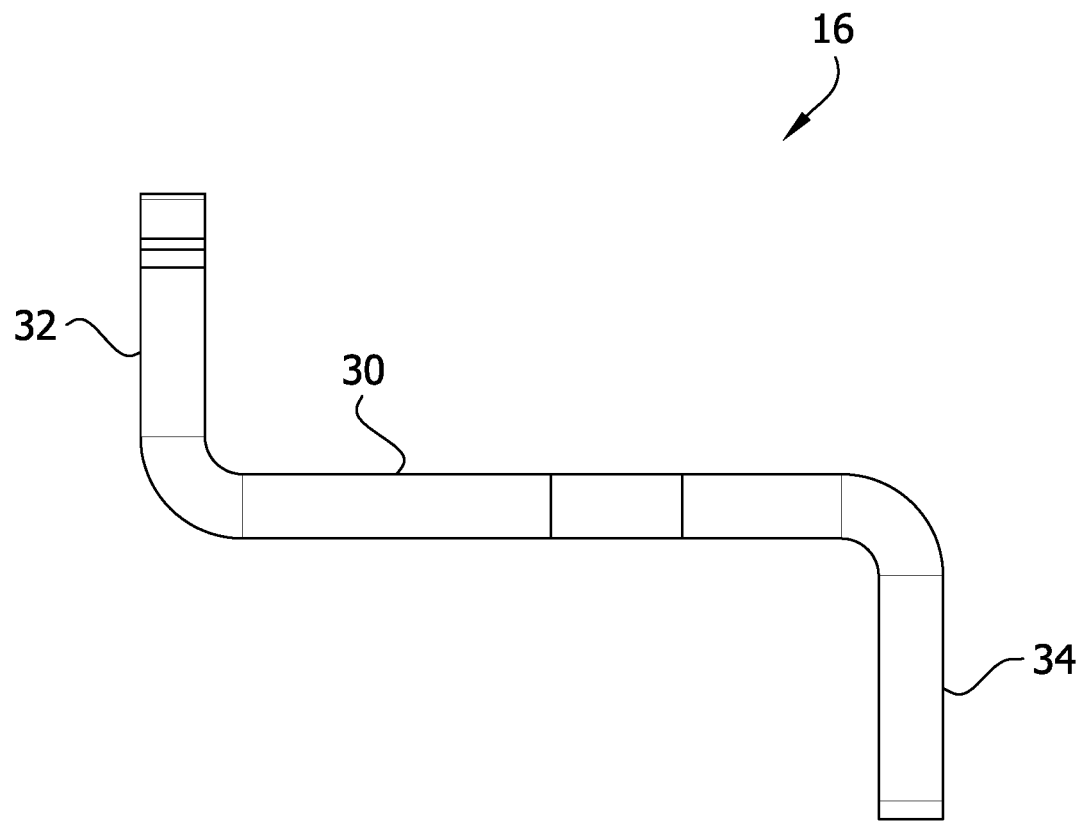
FIG. 6 is a right side elevation of FIG. 3.
Figure 7:
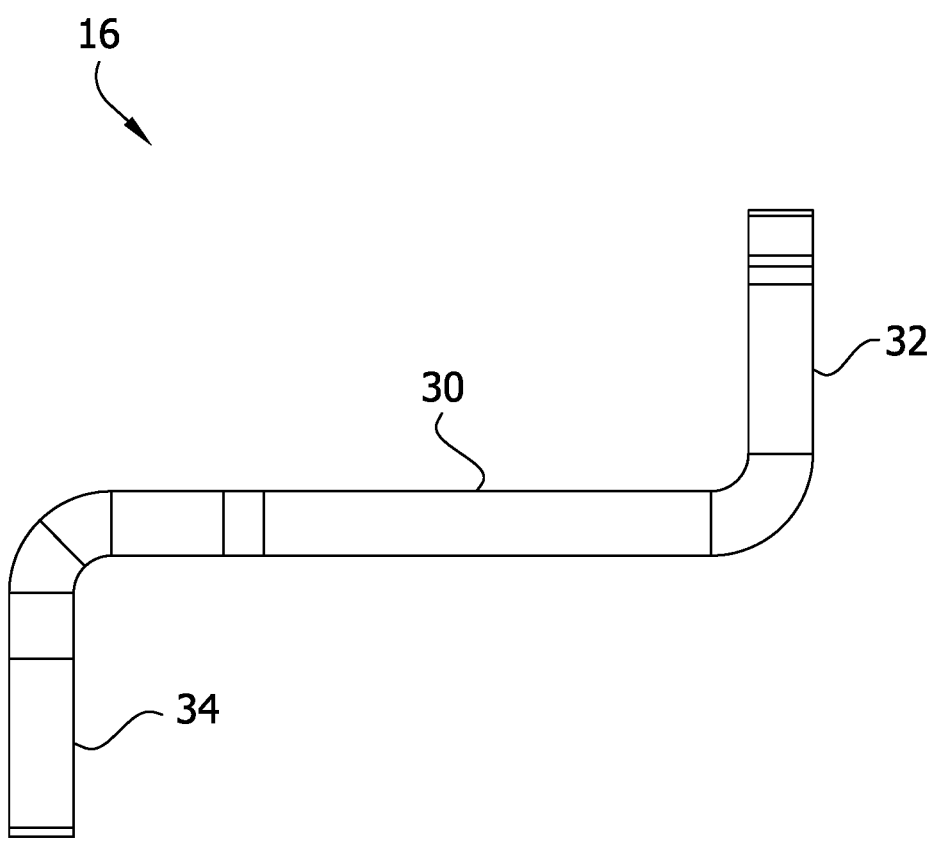
FIG. 7 is a left side elevation of FIG. 3.
Figure 8:
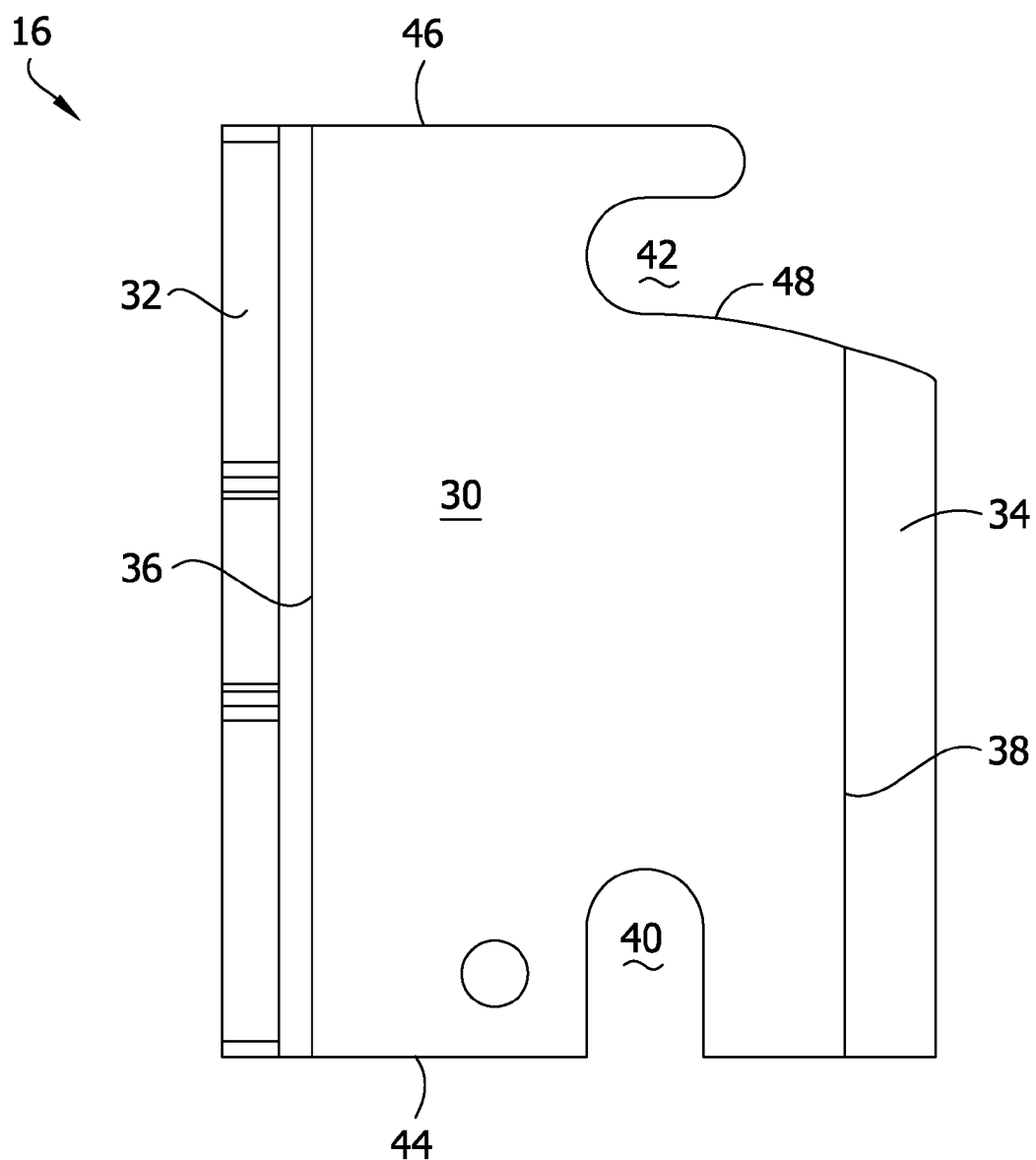
FIG. 8 is a top plan view of FIG. 3.
Figure 9:
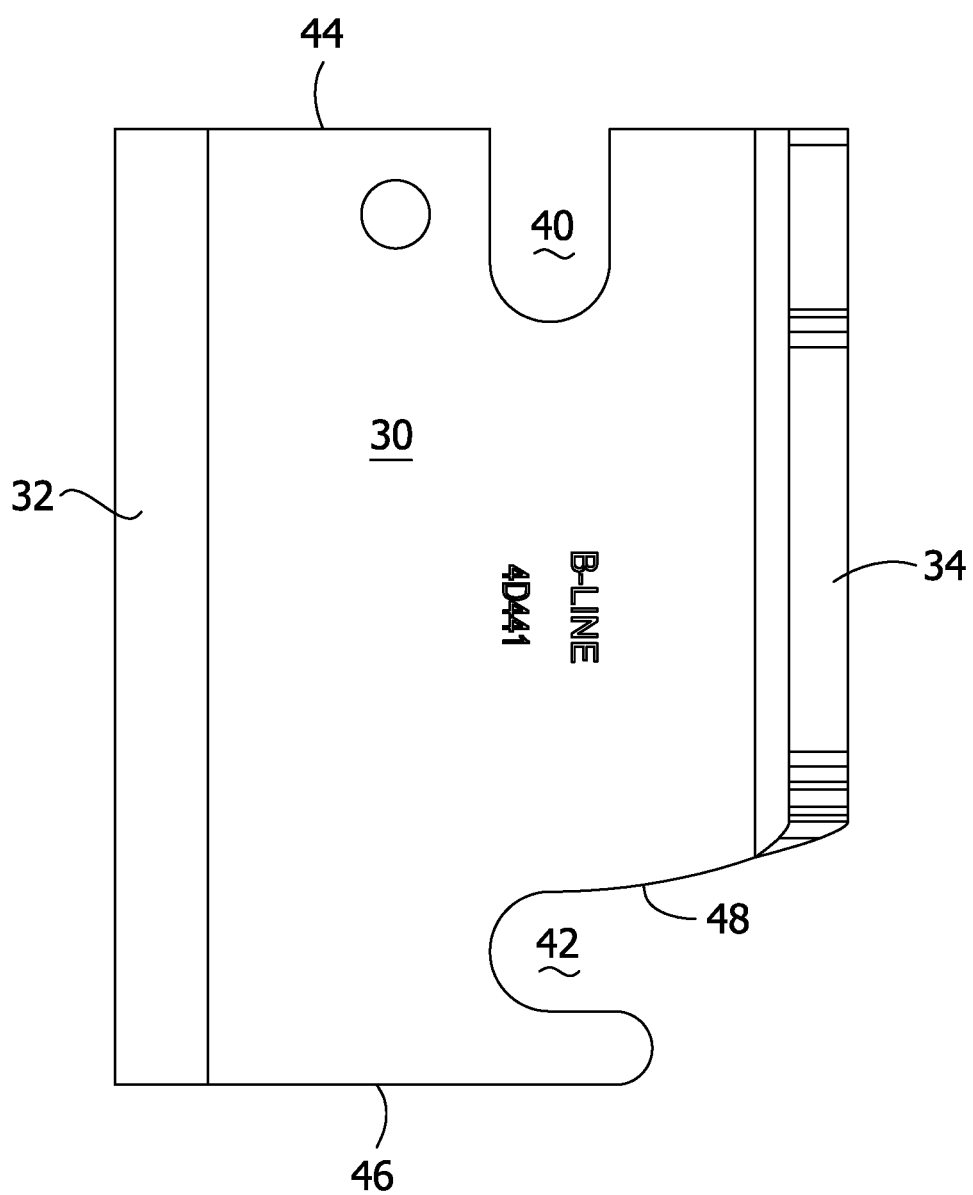
FIG. 9 is a bottom plan view of FIG. 3.

The base 30 includes first and second slots 40, 42 configured to receive the U-bolt 20 therethrough. The first slot 40 extends inward from a first side 44 of the base 30 in a direction toward a second side 46 of the base. The second slot 42 extends inward from the second end 38 of the base 30 in a direction toward the first end 36 of the base. As illustrated, the first and second slots 40, 42 extend generally perpendicular to each other. The first and second slots 40, 42 are located closer to the second end 38 than the first end 36, although other configurations are within the scope of the present invention. As seen in FIGS. 3-5, the second leg 34 does not extend all the way from the first side 44 of the base 30 to the second side 46 of the base due to the slot 42. Thus, the second leg 34 has a shorter length than the first leg 32. As illustrated in FIG. 8, the second slot 42 is partially defined by a curved wall 48. The slots 40, 42 permit the U-bolt 20 to be quickly and easily swung or pivoted into position for connecting the clamp body 16 to the beam B. For example, once a first shank 104 of the U-bolt 20 is inserted into the first slot 40, the second shank of the U-bolt can be swung or pivoted about the first shank into the second slot 42 along the curved wall 48. Alternatively, once a first shank of the U-bolt 20 is inserted into the first slot 40, the clamp body 16 can be swung or pivoted about the first shank toward the second shank so that the second shank enters the second slot 42 along the curved wall 48.

The first leg 32 includes the first strut engagement portion 12 configured for attachment to strut having a first attachment structure, and the second leg 34 includes the second strut engagement portion 14 configured for attachment to strut having a second attachment structure different from the first attachment structure. In the illustrated embodiment, the first strut engagement portion 12 includes a tab 52, and the second strut engagement portion 14 includes a notch 54. It is understood the first and second strut engagement portions 12, 14 can have different configurations within the scope of the present invention. Because the clamp body 16 includes two different strut engagement portions 12, 14, the beam clamp 10 can be used with strut including different attachment structures. The clamp body 16 can be attached to strut in the appropriate orientation depending on the attachment structure of the strut and which strut engagement portion 12, 14 is used to engage the strut attachment structure.

Referring still to FIGS. 3-9, the tab 52 extends outward from a free end 56 of the first leg 32. As illustrated, the tab 52 is generally centered along a length of the first leg 32, although other configurations are within the scope of the present invention. The tab 52 includes sides 58, 60 and a free end 62 extending between the side walls. The side walls 58, 60 of the tab 52 flare away from each other as they extend from the free end 62 of the tab to the free end 56 of the first leg 32. Accordingly, the tab 52 has a first relatively narrower width (e.g., a minimum width) adjacent the free end 62 and a second relatively wider width (e.g., a maximum width) adjacent the free end 56 of the first leg 32. The tab 52 is configured for engaging strut, as described below.

Referring to FIGS. 3-9, the second leg 34 includes a notch 54 extending inward from a free end 66 of the second leg. The notch 54 is defined by opposing side walls 68, 70 and an inner wall 72 extending between the side walls. The side walls 68, 70 flare away from each other as they extend from the inner wall 72 to the free end 66 of the second leg 34. Accordingly, the notch 54 has a first relatively narrower width (e.g., a minimum width) adjacent the inner wall 72 and a second relatively wider width (e.g., a maximum width) at its entrance adjacent the free end 66 of the second leg 34.

Figure 17:
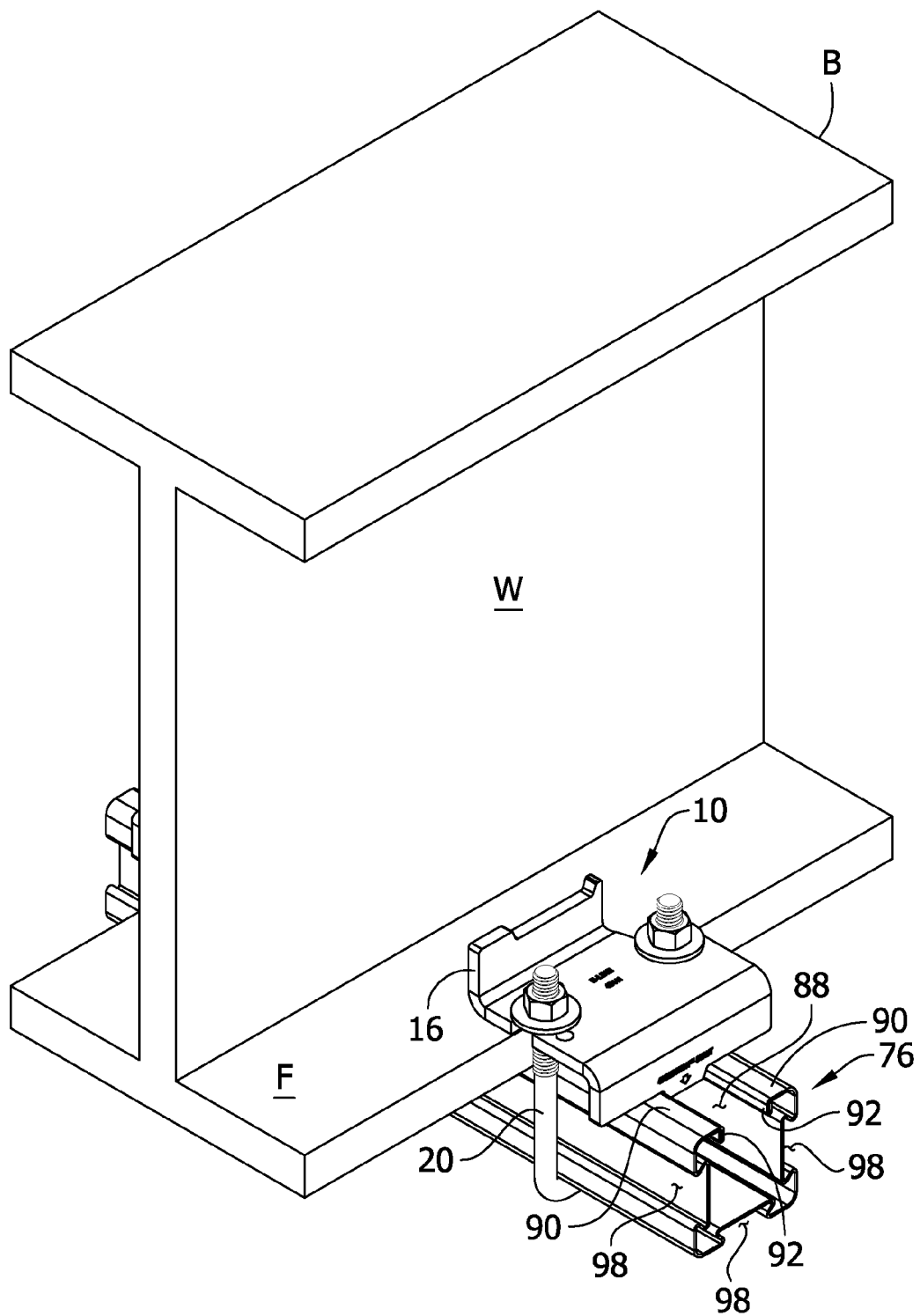
FIG. 17 is a perspective of the beam clamp secured to the beam and mounting a second embodiment of new strut on the beam, with the clamp body in the second orientation.

The beam clamp 10 is configured for attachment to multiple types of strut 76. In general, referring to FIGS. 10-20, the strut 76 is of a first type having an elongate body 78 with a generally square or rectangular cross-sectional shape having an upper side 80, a planar lower side 82, a planar right side 84, and a planar left side 86 (each indicated generally). The upper side 80 defines a continuous slot 88 (i.e., the upper side is open). The upper side 80 has outside surfaces 90 on either side of the slot 88, and inwardly (or downwardly) depending lips 92 leading to an open interior 94 of the strut 76. In some embodiments, the slot 88 is the only attachment structure of the strut 76 (see, e.g., FIGS. 10-12, 16, and 20). In other embodiments, the strut 76 can be of a second type including one or more fitting grooves 98 extending lengthwise of the body 78 (see, e.g., FIGS. 13-15, 17, and 19). For example, the strut can be strut as described in co-pending U.S. application Ser. No. 13/966,897 filed Aug. 14, 2013, the entirety of which is hereby incorporated by reference. At least one of the lower, right, and left sides 82, 84, 86, respectively, can define a fitting groove 98 (see, e.g., FIG. 17). Alternatively, at least the side (e.g., lower side 82) opposite the slotted side (e.g., upper side 80) defines a fitting groove 98, while the other two sides (e.g., the right and left sides 84, 86) may or may not define fitting grooves (see, e.g., FIGS. 13-15). Alternatively, the strut may include at least one fitting groove 98 and no continuous slot (i.e., the upper side is closed).

Figure 13:
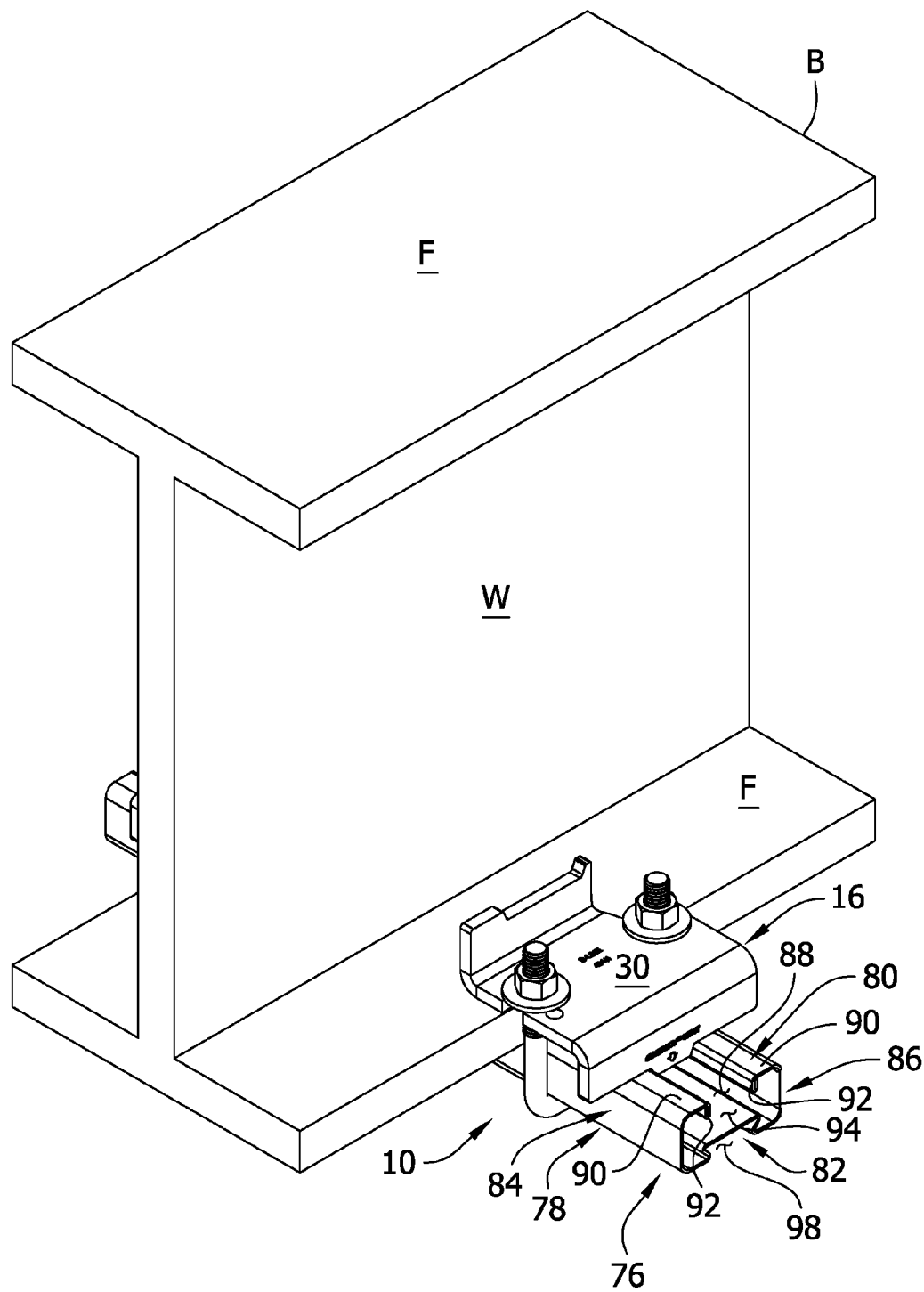
FIG. 13 is a perspective of the beam clamp secured to the beam and mounting a first embodiment of new strut on the beam, with the clamp body in the second orientation.
Figure 14:
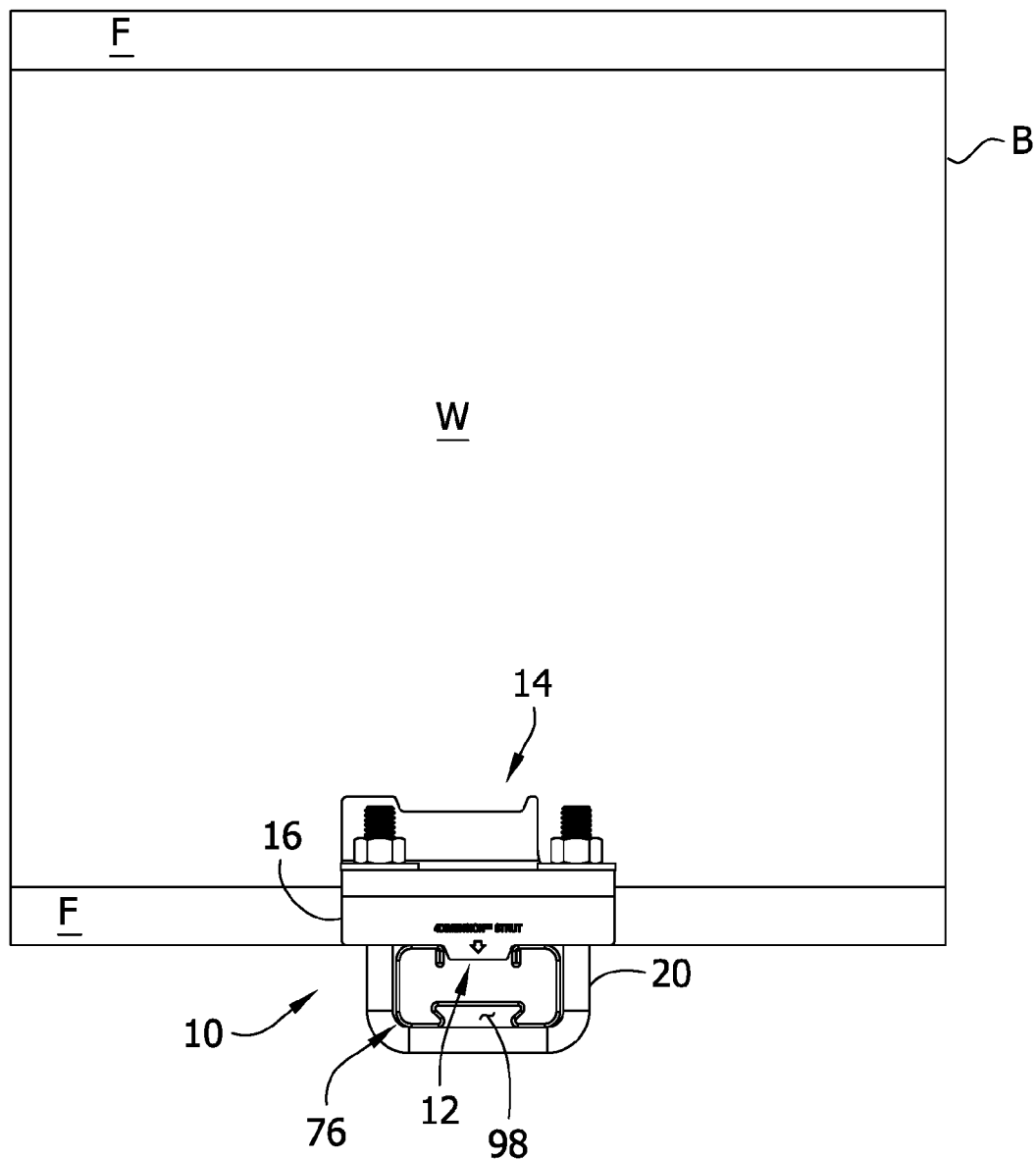
FIG. 14 is a front elevation of FIG. 13.
Figure 15:
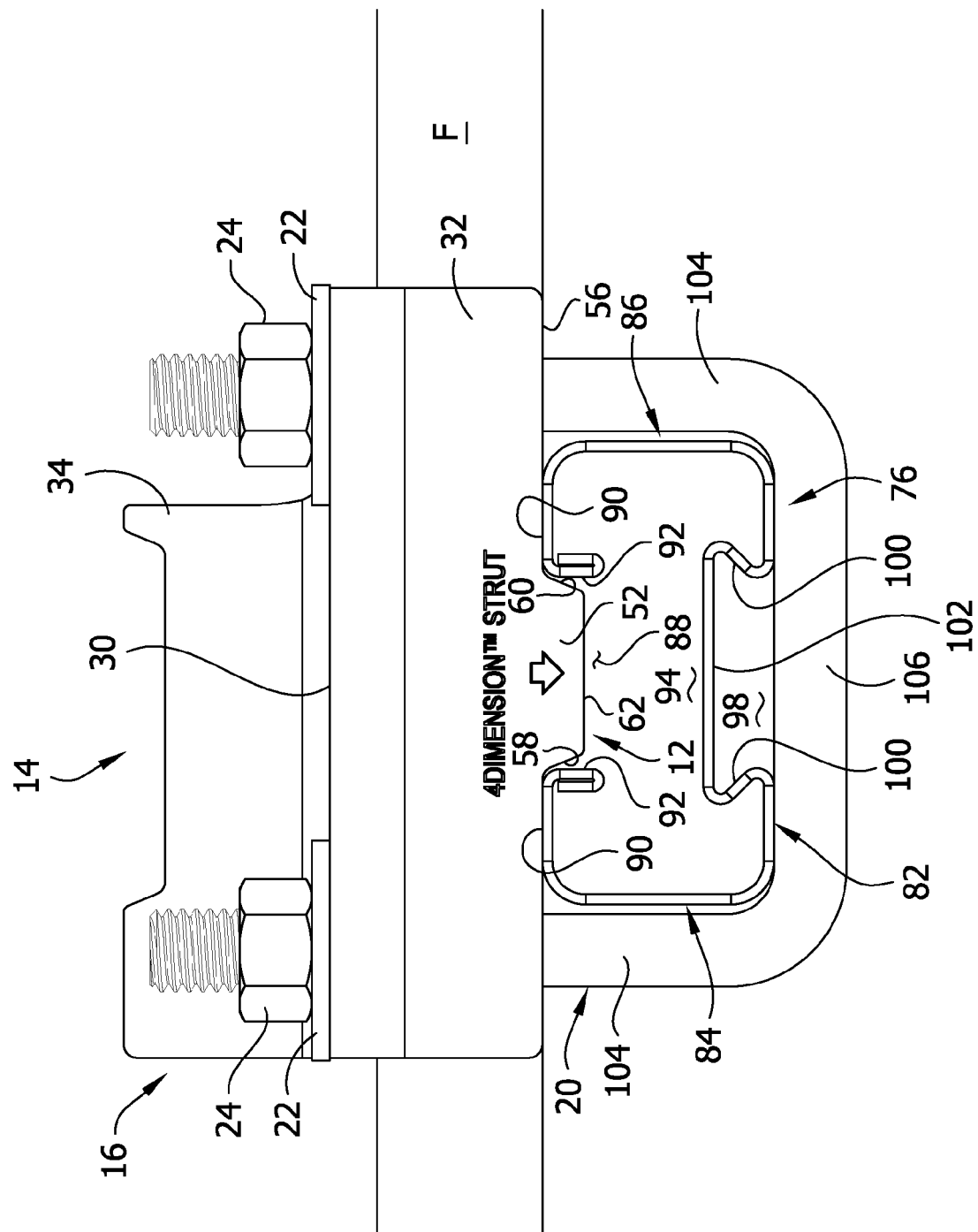
FIG. 15 is an enlarged fragmentary front elevation of FIG. 13.
Figure 16:
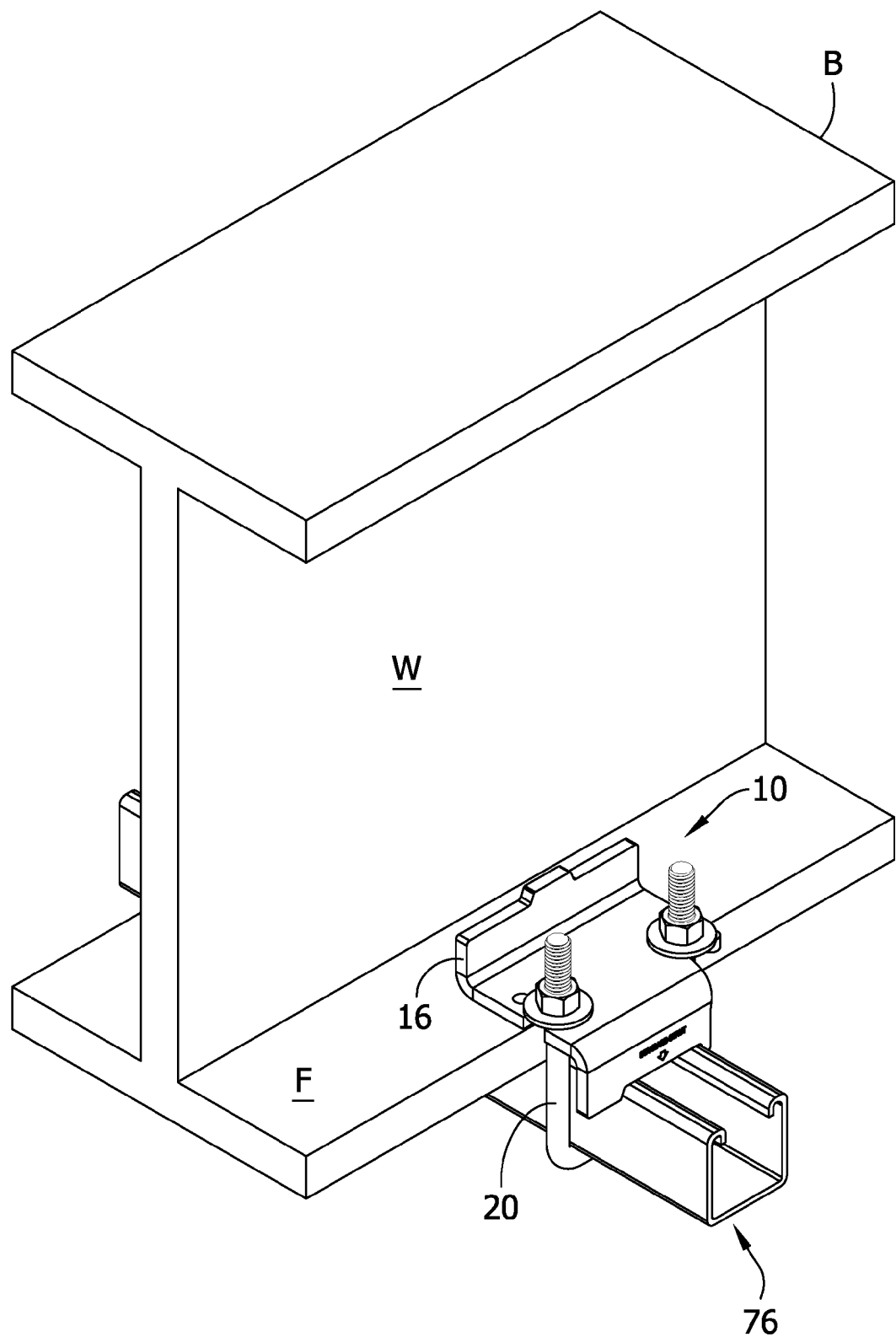
FIG. 16 is a perspective of the beam clamp secured to the beam and mounting a second embodiment of conventional strut on the beam, with the clamp body in the first orientation.

With reference to the embodiments of strut 76 shown in FIGS. 13-15, 17, and 19, each fitting groove 98 is defined by opposing side walls 100 extending inwardly from generally planar outer surfaces of the corresponding side 82, 84, 86 and toward the interior 94 of the body 78 (FIG. 15). The side walls 100 extend to a bottom wall 102 that spans between and interconnects the side walls. The side walls 100 flare away from one another as they extend inward from the outer surfaces toward the bottom 102 of the fitting groove 98 so that each fitting groove has a generally dovetail cross-sectional shape. Accordingly, each fitting groove 98 has a first relatively narrower width (e.g., a minimum width) at its entrance and a second relatively wider width (e.g., a maximum width) adjacent the bottom wall 102. In general, the fitting grooves 98 are configured for receiving a coupling component of a fitting for use in attaching or securing the fitting to any one of the sides 82, 84, 86 of the strut channel 76.

Figure 10:
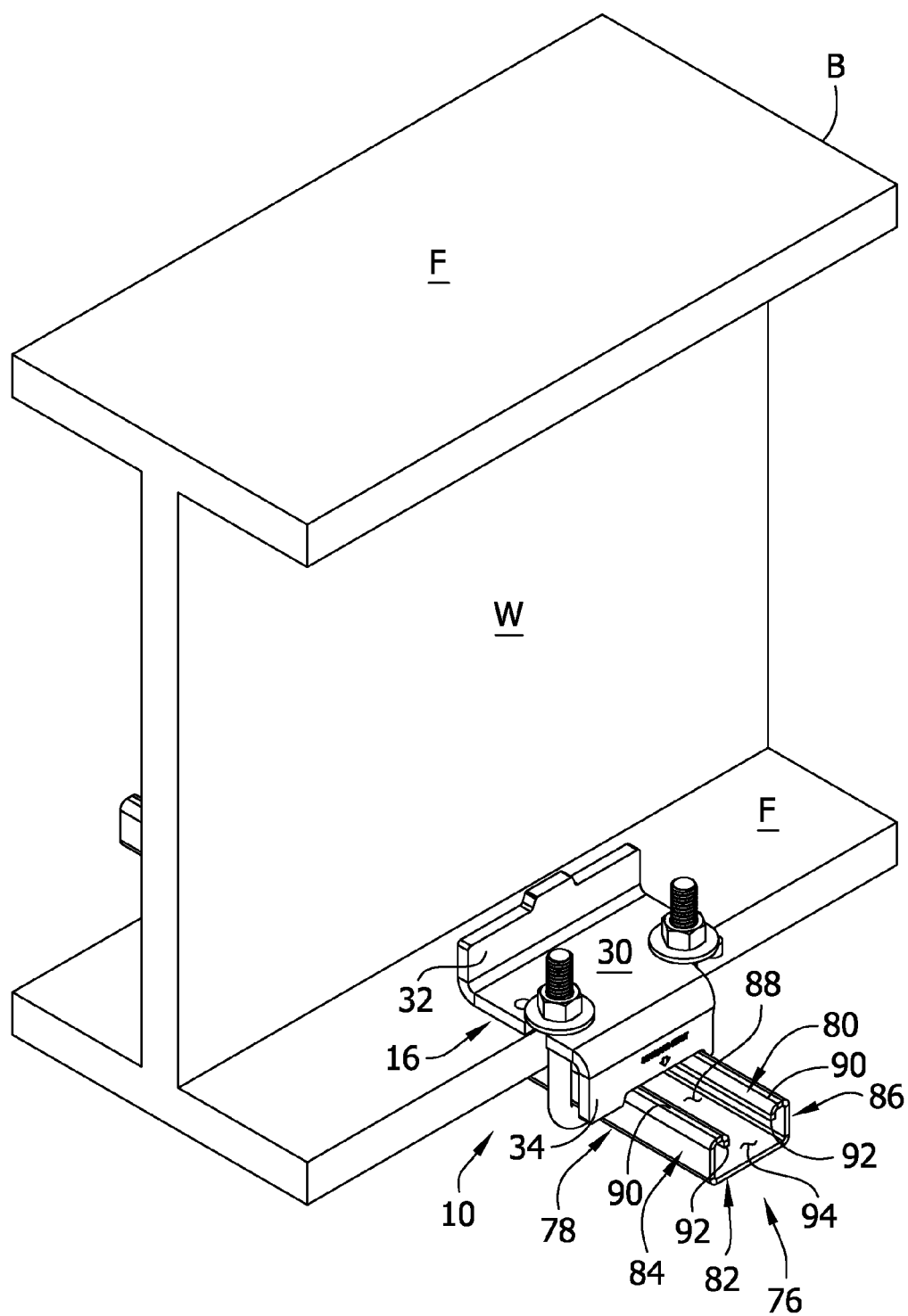
FIG. 10 is a perspective of the beam clamp secured to a beam and mounting a first embodiment of conventional strut on the beam, with the clamp body in the first orientation.
Figure 11:
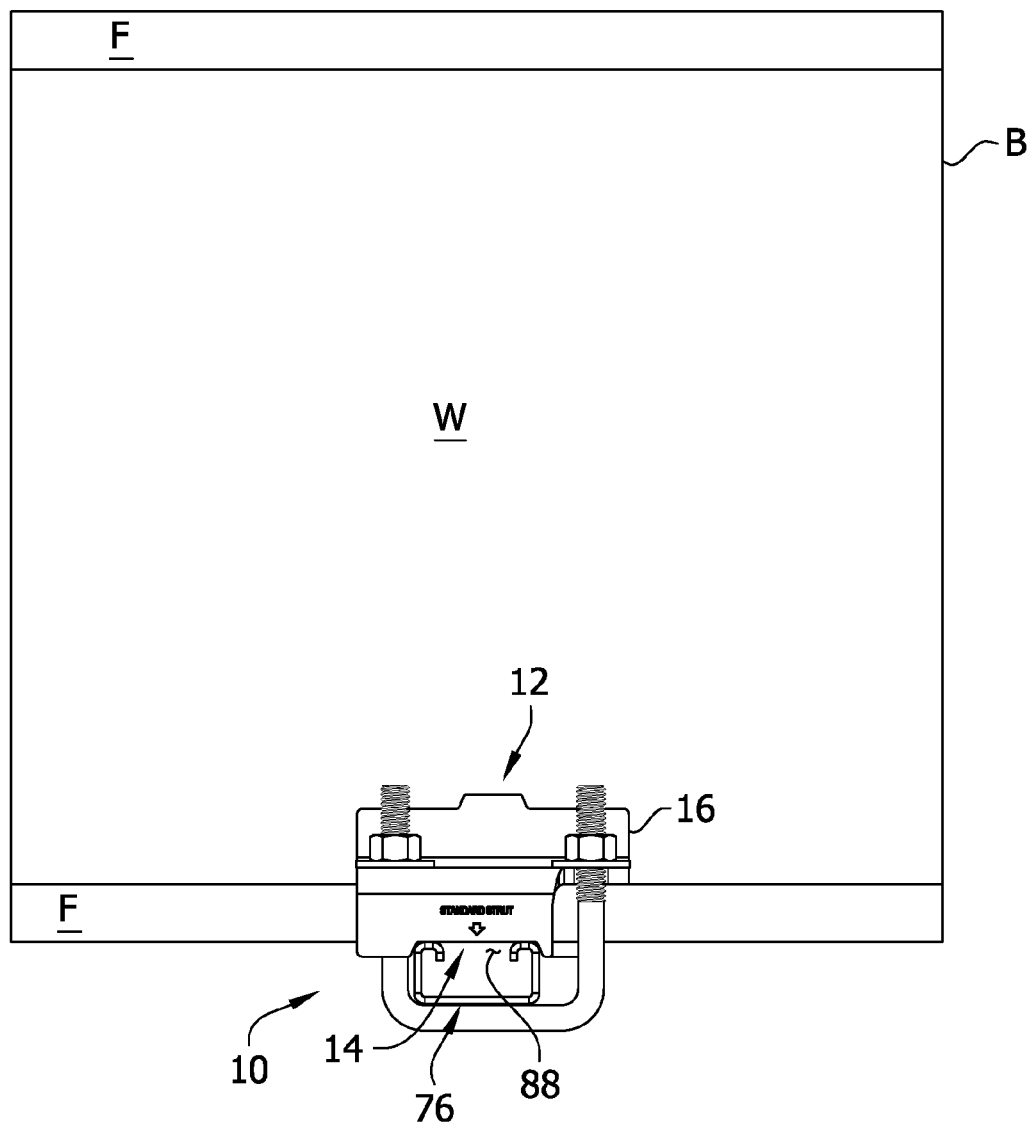
FIG. 11 is a front elevation of FIG. 10.
Figure 12:
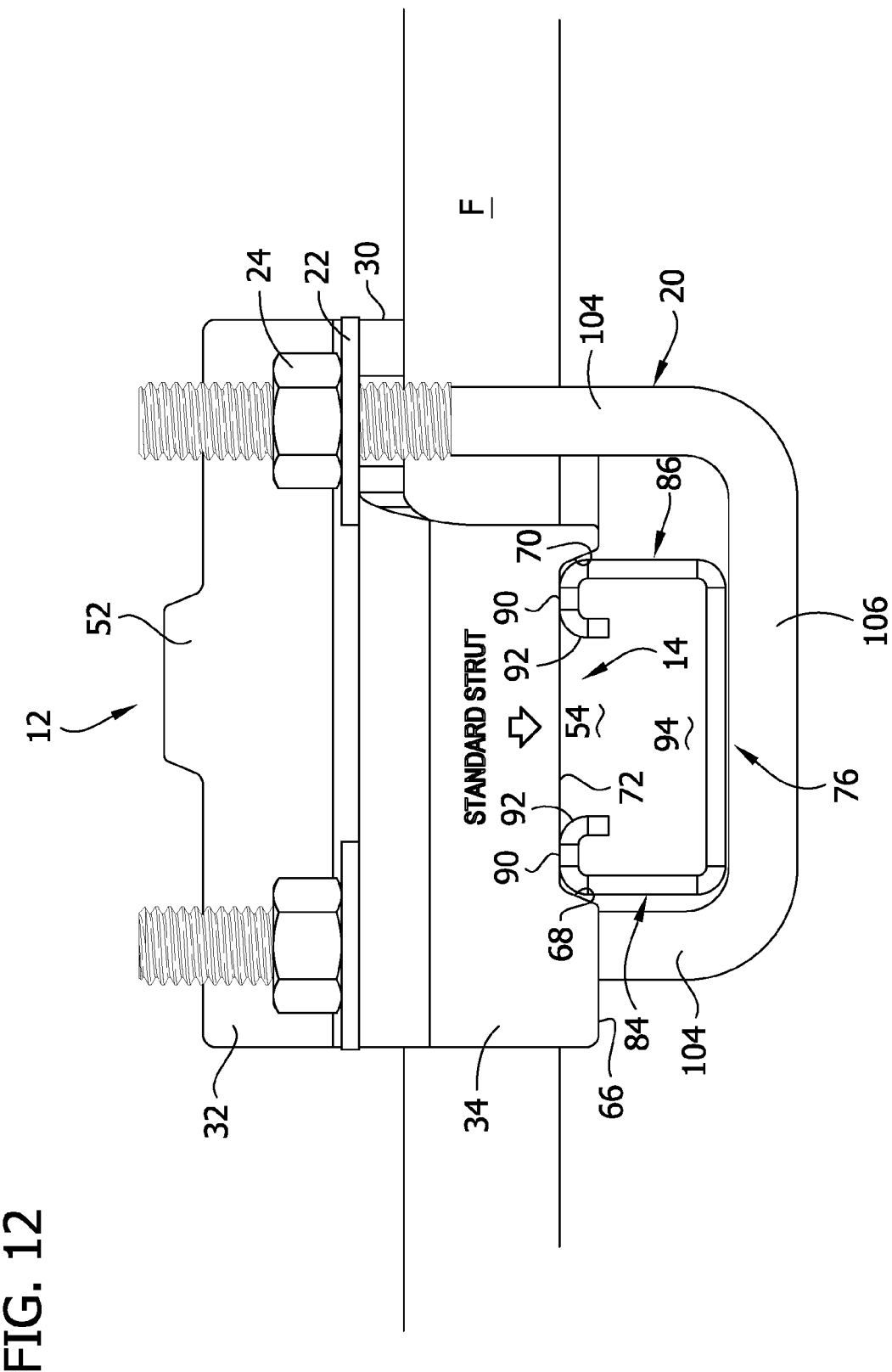
FIG. 12 is an enlarged fragmentary front elevation of FIG. 10.

Referring to FIGS. 10-12, in one embodiment, the beam clamp 10 is in a first orientation wherein the second strut engagement portion 14 is positioned for engagement with the strut 76. At least a portion of the base 30 of the clamp body 16 rests upon and is supported by a flange F of the beam B such that the first leg 32 extends generally upward from the base and the second leg 34 extends generally downward from the base. The second strut engagement portion 14 engages the strut 76 supported on the beam. Specifically, as seen in FIGS. 10-12, a portion of the strut 76 is received in the notch 54 such that the outside surfaces 90 of the upper side 80 engage the inner wall 72 of the notch. Moreover, the side walls 68, 70 of the notch 54 may engage the side walls 84, 86 of the strut 76 or may be slightly spaced from the side walls to define small gaps therebetween. Alternatively, the strut 76 can be received in the notch 54 in a different orientation, such that the inner wall 72 of the notch engages one of the lower, left, and right sides 82, 84, 86 of the strut 76 (not shown). Engagement between the strut 76 and the second strut engagement portion 14 maintains alignment of the strut on the beam B and prevents rotation of the strut relative to the beam. The U-bolt 20 is connected to the clamp body 16 such that shanks 104 of the U-bolt extend through the slots 40, 42, and the bottom 106 of the U-bolt extends below and supports the strut 76. Washers 22 are positioned on the shanks 104 of the U-bolt 20 adjacent the base 30, and nuts 24 are threaded onto the shanks and tightened to attach the beam clamp 10, and therefore the strut 76, to the beam B.

Referring to FIGS. 13-15, in another embodiment, the beam clamp 10 is in a second orientation wherein the first strut engagement portion 12 is positioned for engagement with the strut 76. At least a portion of the base 30 of the clamp body 16 rests upon and is supported by the flange F of the beam B such that the second leg 34 extends generally upward from the base and the first leg 32 extends generally downward from the base. The first strut engagement portion 12 engages the strut 76 supported on the beam B. Specifically, as seen in FIGS. 13-15, the tab 52 is inserted into the open slot 88 of the strut 76. The side walls 58, 60 may engage the lips 92 on either side of the open slot (or be slightly spaced from the lips) and the free end 56 of the first leg 32 may engage the outside surfaces 90 of the upper side 80. Alternatively, the tab 52 can be inserted into the dovetail fitting groove 98 of the strut 76. The side walls 58, 60 of the tab may engage the side walls 100 of the fitting groove (or be slightly spaced from the side walls of the fitting groove) and the free end 56 of the first leg 32 engages the lower side 82 (not shown). Engagement between the strut 76 and the first strut engagement portion 12 maintains alignment of the strut on the beam B and prevents rotation of the strut relative to the beam. The U-bolt 20 is connected to the clamp body 16 such that the shanks 104 of the U-bolt extend through the slots 40, 42, and the bottom 106 of the U-bolt extends below and supports the strut 76. Washers 22 are positioned on the shanks 104 of the U-bolt adjacent the base 30, and nuts 24 are threaded onto the legs and tightened to attach the beam clamp 10, and therefore the strut 76, to the beam B.

Figure 18:
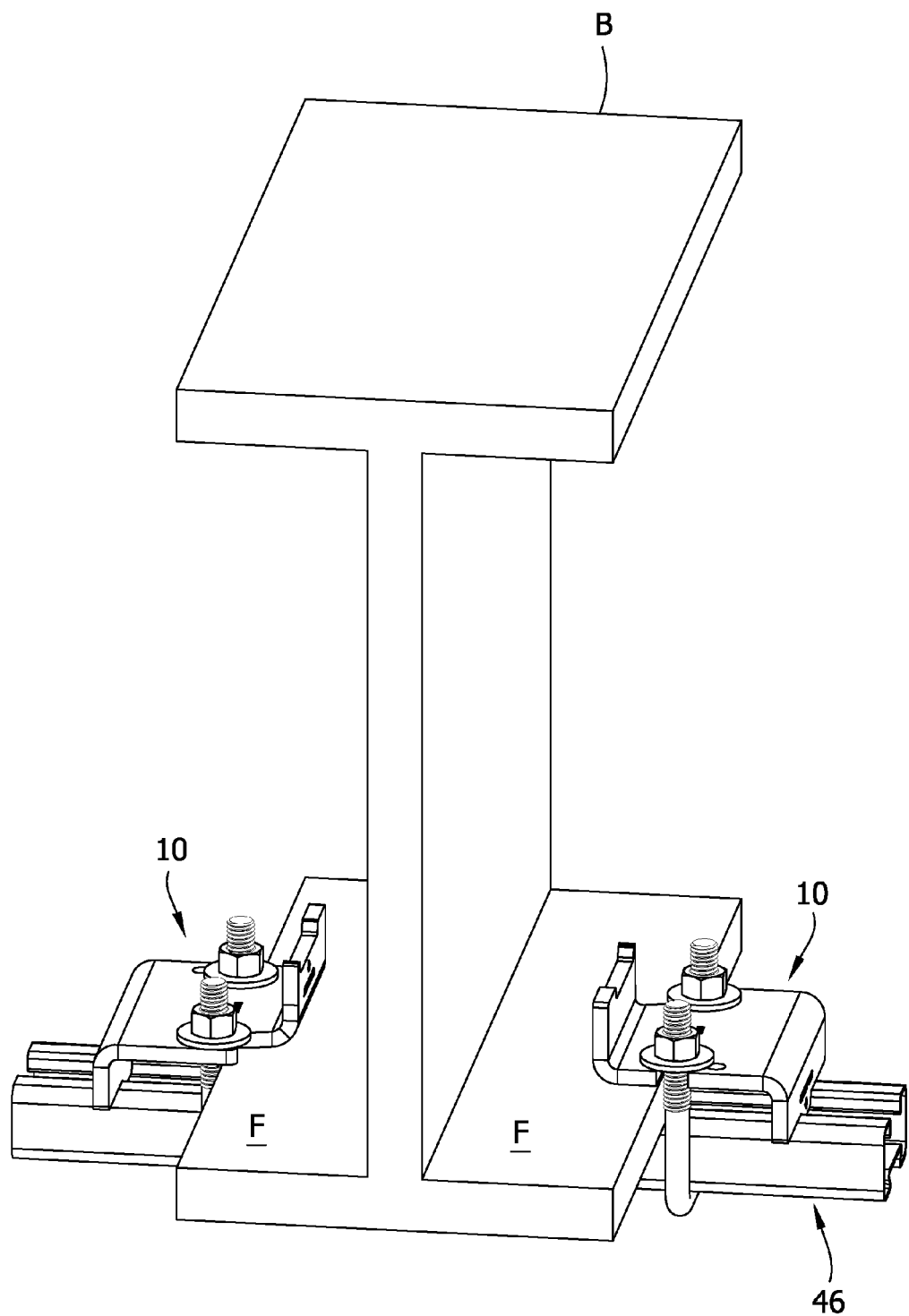
FIG. 18 is a perspective showing multiple beam clamps securing strut to the beam.
Figure 19:
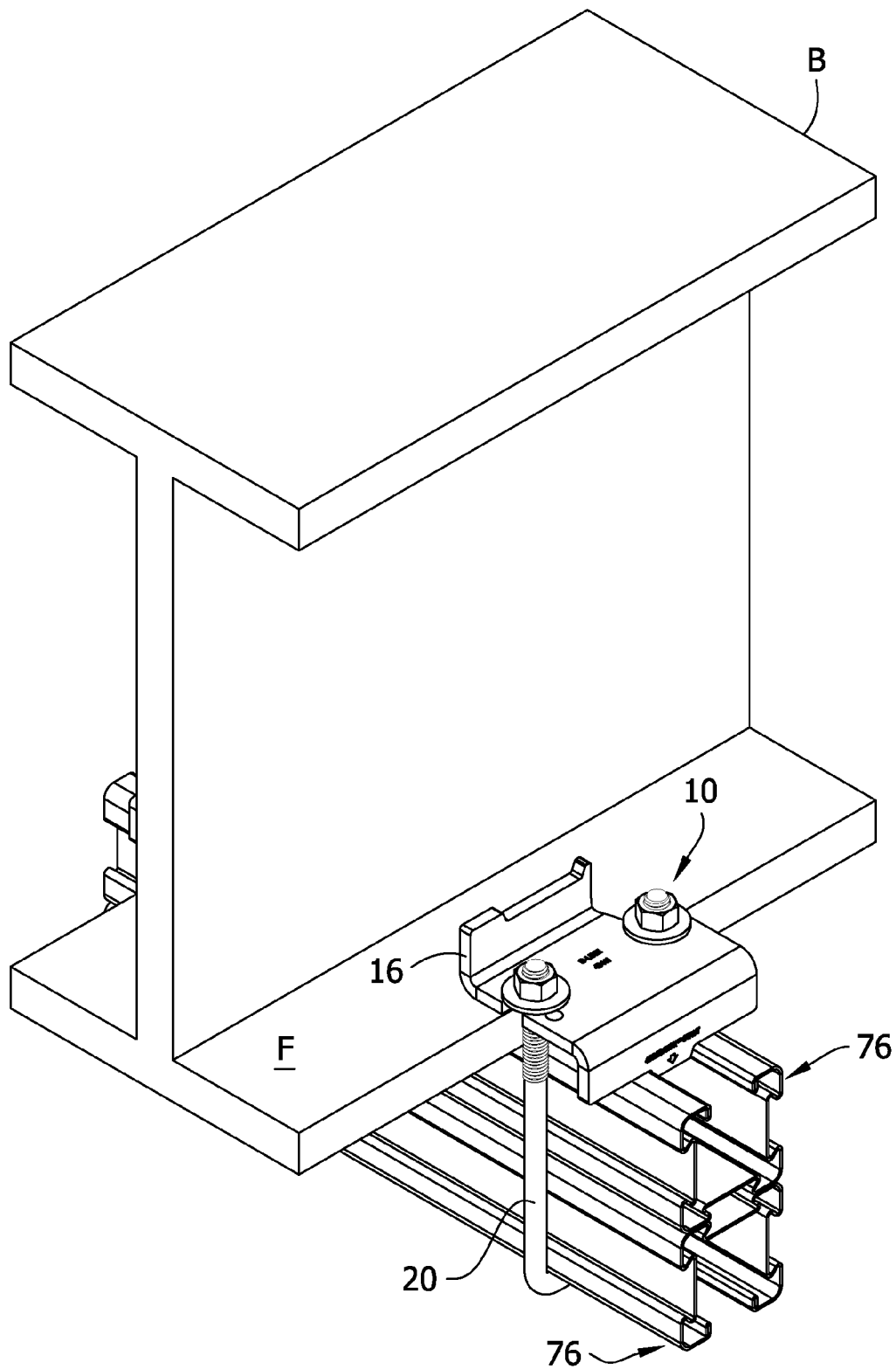
FIG. 19 is a perspective showing the beam clamp securing multiple new struts to the beam.
Figure 20:
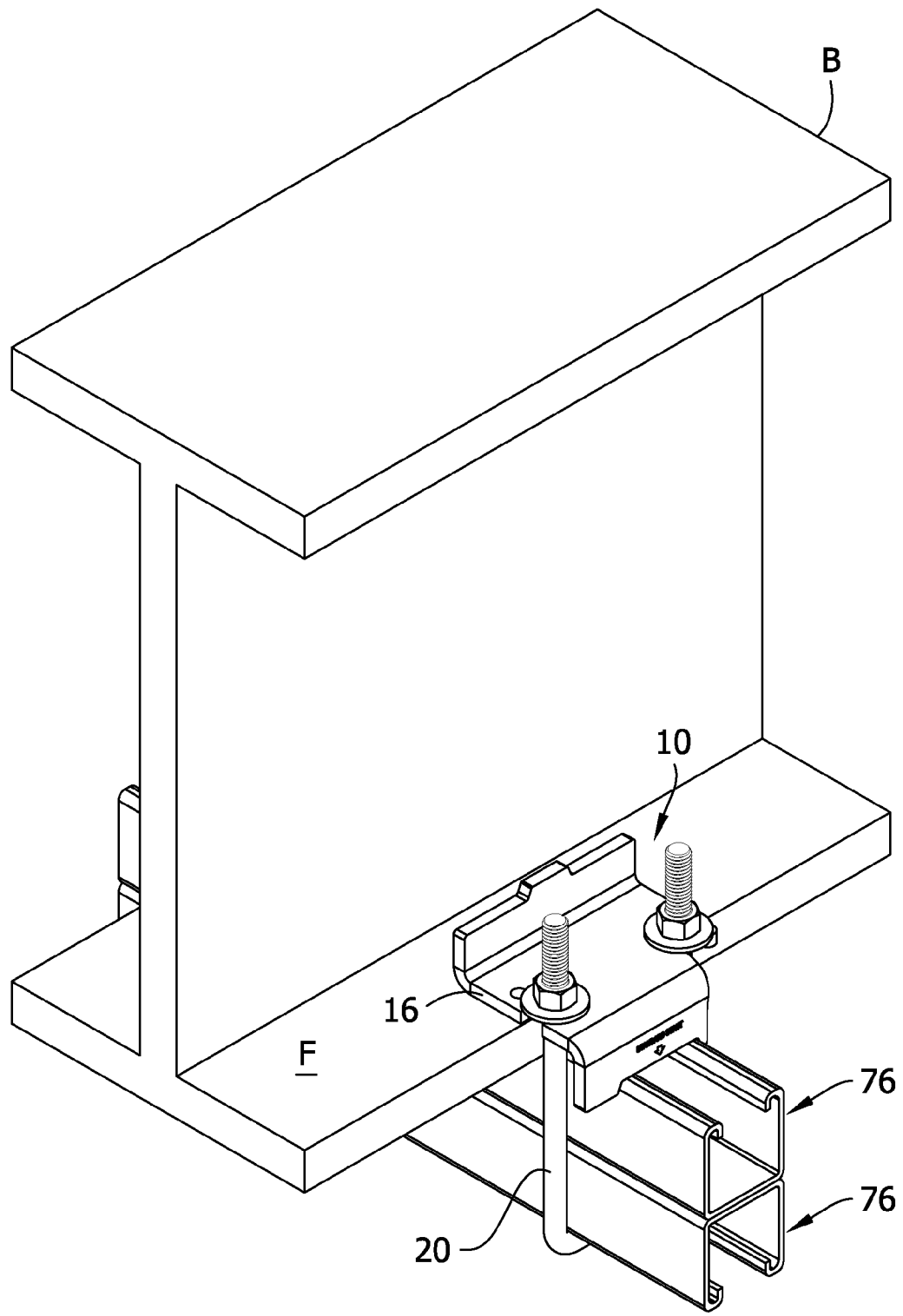
FIG. 20 is a perspective showing the beam clamp securing multiple conventional struts to the beam.

As seen in FIG. 18, preferably a pair of beam clamps 10 is used to attach strut 76 to the beam B, one beam clamp on each side of a web W of the beam. As illustrated in FIGS. 19 and 20, more than one strut 76 can be attached to the beam B by the beam clamp 10. The shanks 104 of the U-bolt 20 can have any desired length to accommodate supporting one or more strut 76 on the beam B. In the illustrated embodiment, the first strut engagement portion 12 is configured for engagement with a new strut, such as the new strut described in the '897 application, and the second strut engagement portion 14 is configured for engagement with a standard or conventional strut. However, other configurations are within the scope of the present invention. For example, the tab 52 can be configured for insertion into the open slot 88 of a standard strut. The notch 54 can be configured for receiving a portion of a new strut. Both of the first and second engagement portions 12, 14 can be tabs configured for engagement with different types of strut. Alternatively, both of the first and second engagement portions 12, 14 can be notches configured for engagement with different types of strut. Either and/or both of the first and second engagement portions 12, 14 can be configured for engagement with one or more types of strut.

The beam clamp 10 is suitable for mounting known strut configurations, such as, for example, the following channel product numbers sold by Cooper B-Line: B22 (see, e.g., FIG. 16), B54 (see, e.g., FIG. 10), Z22 (see, e.g., FIG. 17), Z52 (see, e.g., FIG. 13), and any other known strut. The beam clamp 10 is also suitable for attachment to strut having a different attachment structure than conventional strut, such as the strut having additional functional sides as described in U.S. application Ser. No. 13/966,897. Thus, workers at the job site have the flexibility to mount the strut in any orientation, according to the needs at the job site. Furthermore, the workers need only have one type of beam clamp, rather than requiring different clamp structures for mounting different struts.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A beam clamp for securing strut to a beam, the beam clamp comprising:
 a U-bolt including threaded first and second shanks; and
 a clamp body including
  a base having a first end, a second end opposite the first end, a first side, and a second side opposite the first side, wherein the base defines first and second openings, adjacent the respective first and second sides, sized and shaped to receive the respective first and second shanks of the U-bolt,
  a first leg extending from the first end of the base, the first leg including a first strut engagement portion configured for engaging a first type of strut having a first strut profile for use in securing the first type of strut to the beam, wherein the first strut engagement portion comprises a tab extending outward from a free end of the first leg, wherein the tab is configured to be received in a selected one of a slot and a groove of the first type of strut, and
  a second leg extending from the second end of the base, the second leg including a second strut engagement portion configured for engaging a second type of strut having a second strut profile for use in securing the second type of strut to the beam, wherein the second strut engagement portion comprises a notch extending inward from a free end of the second leg, wherein the notch is sized and shaped to receive a side of the second type of strut,
 wherein the first strut engagement portion extends from the base in a first direction generally perpendicular to the base, and the second strut engagement portion extends from the base in a second direction opposite the first direction and generally perpendicular to the base.

2. The beam clamp set forth in claim 1, wherein the first opening comprises a first slot extending inward from adjacent the second end of the base toward the first end of the base.

3. The beam clamp set forth in claim 2, wherein the second opening comprises a second slot extending inward from the first side of the base toward the second side of the base.

4. The beam claim set forth in claim 3, wherein the second slot extends generally perpendicular to the first slot.

5. A strut and beam clamp system comprising:
 a first strut having a first profile and including upper, lower, left, and right sides, a longitudinal groove defined by the lower side, and a continuous slot extending along the upper side; and
 a beam clamp secured to the first strut and comprising a U-bolt including threaded first and second shanks, and a clamp body including
  a base having a first end, a second end opposite the first end, a first side, and a second side opposite the first side, wherein the base defines first and second openings adjacent the respective first and second sides, wherein the first and second shanks of the U-bolt are secured in the first and second openings, respectively, a first leg extending from the first end of the base, the first leg including a tab extending outward from a free end of the second leg, wherein the tab is configured to be received in the continuous slot and the groove of the first strut, and a second leg extending from the second end of the base, the second leg including a notch extending inward from a free end of the first leg, wherein the notch is sized and shaped to receive a side of a second type of strut having a second profile different from the first profile, wherein the tab is received in one of the slot and the groove of the first strut.

6. The strut and beam clamp system set forth in claim 5, wherein the first opening comprises a first slot extending inward from adjacent the second end of the base toward the first end of the base.

7. The strut and beam clamp system set forth in claim 6, wherein the second opening comprises a second slot extending inward from the first side of the base toward the second side of the base.

8. The strut and beam clamp system set forth in claim 7, wherein the second slot extends generally perpendicular to the first slot.

9. A strut and beam clamp system comprising:
a first strut having a first profile and including upper, lower, left, and right sides, and a continuous slot extending along the upper side; and
a beam clamp secured to the first strut and comprising a U-bolt including threaded first and second shanks, and a clamp body including a base having a first end, a second end opposite the first end, a first side, and a second side opposite the first side, wherein the base defines first and second openings adjacent the respective first and second sides, wherein the first and second shanks of the U-bolt are secured in the first and second openings, respectively, a first leg extending from the first end of the base in a first direction generally perpendicular to the base, the first leg including a tab extending outward from a free end of the second leg, wherein the tab is configured to be selectively received in one of a continuous slot and a groove of a second type of strut having a second profile different from the first profile, and a second leg extending from the second end of the base in a second direction opposite the first direction and generally perpendicular to the base, the second leg including a notch extending inward from a free end of the first leg, wherein the notch is sized and shaped to selectively receive one of the upper, lower, left, and right sides of the first strut wherein one of the upper, lower, left, and right sides of the first strut is received in the notch of the first leg.

10. The strut and beam clamp system set forth in claim 9, wherein the first opening comprises a first slot extending inward from adjacent the second end of the base toward the first end of the base.

11. The strut and beam clamp system set forth in claim 10, wherein the second opening comprises a second slot extending inward from the first side of the base toward the second side of the base.

12. The strut and beam clamp system set forth in claim 11, wherein the second slot extends generally perpendicular to the first slot.

* * * * *